US009726282B2

(12) United States Patent
Pohl et al.

(10) Patent No.: US 9,726,282 B2
(45) Date of Patent: *Aug. 8, 2017

(54) CONTINUOUSLY VARIABLE TRANSMISSION

(71) Applicant: Fallbrook Intellectual Property Company LLC, Cedar Park, TX (US)

(72) Inventors: Brad P. Pohl, Leander, TX (US); Donald C. Miller, Encinitas, CA (US); Robert A. Smithson, Cedar Park, TX (US); Jeremy Carter, Austin, TX (US); Charles B. Lohr, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/695,612

(22) Filed: Apr. 24, 2015

(65) Prior Publication Data

US 2015/0226323 A1    Aug. 13, 2015

Related U.S. Application Data

(63) Continuation of application No. 13/934,963, filed on Jul. 3, 2013, now Pat. No. 9,017,207, which is a
(Continued)

(51) Int. Cl.
*F16H 15/28* (2006.01)
*F16H 61/664* (2006.01)
(Continued)

(52) U.S. Cl.
CPC ......... *F16H 61/6646* (2013.01); *F02B 67/04* (2013.01); *F16H 15/28* (2013.01);
(Continued)

(58) Field of Classification Search
CPC .......... Y10T 477/619; Y10T 477/6223; F16H 61/6446; F16H 15/28; F16H 61/132; F16H 15/50; F16H 2061/664; F02B 67/04
(Continued)

(56) References Cited

U.S. PATENT DOCUMENTS

| 719,595 A | 2/1903 | Huss |
| 1,121,210 A | 12/1914 | Techel |

(Continued)

FOREIGN PATENT DOCUMENTS

| CH | 118064 | 12/1926 |
| CN | 1054340 | 9/1991 |

(Continued)

OTHER PUBLICATIONS

Office Action dated Feb. 24, 2010 from Japanese Patent Application No. 2006-508892.
(Continued)

*Primary Examiner* — Roger Pang
(74) *Attorney, Agent, or Firm* — Knobbe Martens Olson & Bear LLP

(57) ABSTRACT

Embodiments are directed to a front end accessory drive (FEAD) and power modulating devices (PMD) which can be used in a FEAD. In one embodiment, a continuously variable transmission (CVT) is coupled directly to a crankshaft of a prime mover, and the CVT is used to regulate the speed and/or torque delivered to an accessory. A compound drive device includes a motor/generator subassembly cooperating with a CVT subassembly to provide a motor functionality with torque multiplication or division, or alternatively, a generator functionality with torque multiplication or division. In some embodiments, a FEAD includes a PMD having a sun shaft configured to couple to a sun of the PMD and to an electric motor component, such as an electrical
(Continued)

armature or an electrical field. In one embodiment, the electrical armature the electrical field are placed concentrically and coaxially and configured to rotate relative to one another in opposite directions.

17 Claims, 28 Drawing Sheets

Related U.S. Application Data continuation of application No. 12/306,393, filed as application No. PCT/US2007/014510 on Jun. 21, 2007, now Pat. No. 8,480,529.

(60) Provisional application No. 60/816,713, filed on Jun. 26, 2006.

(51) Int. Cl.
*F02B 67/04* (2006.01)
*F16H 15/50* (2006.01)
*F16H 61/32* (2006.01)
*F01B 9/04* (2006.01)

(52) U.S. Cl.
CPC ............. *F16H 15/50* (2013.01); *F16H 61/32* (2013.01); *F01B 2009/045* (2013.01); *F16H 2061/6644* (2013.01); *Y10T 477/619* (2015.01); *Y10T 477/6223* (2015.01)

(58) Field of Classification Search
USPC ......... 475/150, 189–192, 196–197; 180/65.8
See application file for complete search history.

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielsen |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,131,158 A | 9/1938 | Almen et al. |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,586,725 A | 2/1952 | Henry |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A * | 2/1959 | Oehrli ..................... F01P 7/046 475/115 |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,035,460 A | 5/1962 | Guichard |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,186 A | 5/1983 | Cronin |
| 4,391,156 A | 7/1983 | Tibbals |

(56) References Cited

U.S. PATENT DOCUMENTS

| | | |
|---|---|---|
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,569,670 A * | 2/1986 | McIntosh ............... F02B 67/06 474/16 |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schivelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,086,506 A | 7/2000 | Petersmann et al. |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,296,593 B1 | 10/2001 | Gotou |
| 6,311,113 B1 | 10/2001 | Danz et al. |
| 6,312,358 B1 * | 11/2001 | Goi ..................... F16H 15/38 476/11 |
| 6,322,475 B2 | 11/2001 | Miller |
| 6,325,386 B1 | 12/2001 | Shoge |
| 6,358,174 B1 | 3/2002 | Folsom et al. |
| 6,358,178 B1 | 3/2002 | Wittkopp |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,527,662 B2 | 3/2003 | Miyata et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |

(56) References Cited

U.S. PATENT DOCUMENTS

| | | |
|---|---|---|
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,868,949 B2 | 3/2005 | Braford |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,749 B2 | 6/2008 | Schafer et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,054,043 B2 | 11/2011 | Yano |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |

(56) References Cited

U.S. PATENT DOCUMENTS

| | | |
|---|---|---|
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,818,661 B2 | 8/2014 | Keilers et al. |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2 | 11/2014 | Lohr et al. |
| 8,900,085 B2 | 12/2014 | Pohl et al. |
| 8,920,285 B2 | 12/2014 | Smithson et al. |
| 8,924,111 B2 | 12/2014 | Fuller |
| 8,996,263 B2 | 3/2015 | Quinn et al. |
| 9,017,207 B2 * | 4/2015 | Pohl .................. F02B 67/04 475/150 |
| 9,046,158 B2 | 6/2015 | Miller et al. |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0169051 A1 | 11/2002 | Oshidari |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0085979 A1 | 4/2005 | Carlson et al. |
| 2005/0181905 A1 * | 8/2005 | Ali .................. F02B 67/06 475/210 |
| 2005/0184580 A1 | 8/2005 | Kuan et al. |
| 2005/0227809 A1 | 10/2005 | Bitzer et al. |
| 2006/0006008 A1 | 1/2006 | Brunemann et al. |
| 2006/0052204 A1 | 3/2006 | Eckert et al. |
| 2006/0108956 A1 | 5/2006 | Clark |
| 2006/111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0228687 A1 | 10/2007 | Parker |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0149407 A1 | 6/2008 | Shibata et al. |
| 2008/0183358 A1 * | 7/2008 | Thomson .................. B60W 10/06 701/54 |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0093479 A1 | 4/2010 | Carter et al. |
| 2010/0145573 A1 | 6/2010 | Vasilescu |
| 2011/0127096 A1 | 6/2011 | Schneidewind |
| 2011/0230297 A1 | 9/2011 | Shiina et al. |
| 2011/0291507 A1 | 12/2011 | Post |
| 2011/0319222 A1 | 12/2011 | Ogawa et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0146406 A1 | 6/2013 | Nichols et al. |
| 2013/0152715 A1 | 6/2013 | Pohl et al. |
| 2013/0190123 A1 | 7/2013 | Pohl et al. |
| 2013/0288848 A1 | 10/2013 | Carter et al. |
| 2013/0337971 A1 | 12/2013 | Kolstrup |
| 2014/0038771 A1 | 2/2014 | Miller |
| 2014/0073470 A1 | 3/2014 | Carter et al. |
| 2014/0121922 A1 | 5/2014 | Vasiliotis et al. |
| 2014/0128195 A1 | 5/2014 | Miller et al. |
| 2014/0141919 A1 | 5/2014 | Bazyn et al. |
| 2014/0144260 A1 | 5/2014 | Nichols et al. |
| 2014/0148303 A1 | 5/2014 | Nichols et al. |
| 2014/0179479 A1 | 6/2014 | Nichols et al. |

(56) References Cited

U.S. PATENT DOCUMENTS

| | | |
|---|---|---|
| 2014/0206499 A1 | 7/2014 | Lohr |
| 2014/0248988 A1 | 9/2014 | Lohr et al. |
| 2014/0257650 A1 | 9/2014 | Carter et al. |
| 2014/0274536 A1 | 9/2014 | Versteyhe |
| 2014/0323260 A1 | 10/2014 | Miller et al. |
| 2014/0329637 A1 | 11/2014 | Thomassy et al. |
| 2014/0335991 A1 | 11/2014 | Lohr et al. |
| 2014/0365059 A1 | 12/2014 | Keilers et al. |
| 2015/0018154 A1 | 1/2015 | Thomassy |
| 2015/0039195 A1 | 2/2015 | Pohl et al. |
| 2015/0051801 A1 | 2/2015 | Quinn et al. |
| 2015/0072827 A1 | 3/2015 | Lohr et al. |
| 2015/0080165 A1 | 3/2015 | Pohl et al. |
| 2015/0233473 A1 | 8/2015 | Miller et al. |
| 2015/0260284 A1 | 9/2015 | Miller et al. |
| 2015/0337928 A1 | 11/2015 | Smithson |
| 2015/0345599 A1 | 12/2015 | Ogawa |
| 2015/0369348 A1 | 12/2015 | Nichols et al. |
| 2015/0377305 A1 | 12/2015 | Nichols et al. |
| 2016/0003349 A1 | 1/2016 | Kimura et al. |
| 2016/0040763 A1 | 2/2016 | Nichols et al. |
| 2016/0061301 A1 | 3/2016 | Bazyn et al. |
| 2016/0146342 A1 | 5/2016 | Vasiliotis et al. |
| 2016/0178037 A1 | 6/2016 | Pohl |
| 2016/0186847 A1 | 6/2016 | Nichols et al. |
| 2016/0201772 A1 | 7/2016 | Lohr et al. |
| 2016/0244063 A1 | 8/2016 | Carter et al. |
| 2016/0273627 A1 | 9/2016 | Miller et al. |
| 2016/0298740 A1 | 10/2016 | Carter et al. |

FOREIGN PATENT DOCUMENTS

| | | |
|---|---|---|
| CN | 2245830 | 1/1997 |
| CN | 1157379 | 8/1997 |
| CN | 1167221 | 12/1997 |
| CN | 1204991 | 1/1999 |
| CN | 1283258 | 2/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1568407 | 1/2005 |
| CN | 1654858 | 8/2005 |
| CN | 2714896 | 8/2005 |
| CN | 1736791 | 2/2006 |
| CN | 1738163 | 2/2006 |
| CN | 1847702 | 10/2006 |
| CN | 1860315 | 11/2006 |
| CN | 1940348 | 4/2007 |
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 | 5/2000 |
| DE | 10155372 | 5/2003 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0 976 956 | 2/2000 |
| EP | 1 136 724 | 9/2001 |
| EP | 1 366 978 | 3/2003 |
| EP | 1 433 641 | 6/2004 |
| EP | 1 624 230 | 2/2006 |
| EP | 2 893 219 | 7/2015 |
| FR | 620375 | 4/1927 |
| FR | 2460427 | 1/1981 |
| FR | 2590638 | 5/1987 |
| GB | 391448 | 4/1933 |
| GB | 592320 | 9/1947 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035482 | 6/1980 |
| GB | 2080452 | 8/1982 |
| JP | 38-025315 | 11/1963 |
| JP | 41-3126 | 2/1966 |
| JP | 42-2843 | 2/1967 |
| JP | 42-2844 | 2/1967 |
| JP | 44-1098 | 1/1969 |
| JP | 47-000448 | 1/1972 |
| JP | 47-207 | 6/1972 |
| JP | 47-20535 | 6/1972 |
| JP | 47-00962 | 11/1972 |
| JP | 47-29762 | 11/1972 |
| JP | 47-42704 | 12/1972 |
| JP | 48-28908 | 4/1973 |
| JP | 48-54371 | 7/1973 |
| JP | 49-012742 | 3/1974 |
| JP | 49-12742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 52-35481 | 3/1977 |
| JP | 53-048166 | 1/1978 |
| JP | 55-135259 | 10/1980 |
| JP | 56-047231 | 4/1981 |
| JP | 56-101448 | 8/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 12/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63-160465 | 10/1988 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 06-050358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-511621 | 11/1998 |

(56) References Cited

FOREIGN PATENT DOCUMENTS

| | | | |
|---|---|---|---|
| JP | 11-063130 | 3/1999 | |
| JP | 11-091411 | 4/1999 | |
| JP | 11-257479 | 9/1999 | |
| JP | 2000-46135 | 2/2000 | |
| JP | 2000-177673 | 6/2000 | |
| JP | 2001-027298 | 1/2001 | |
| JP | 2001-071986 | 3/2001 | |
| JP | 2001-107827 | 4/2001 | |
| JP | 2001-165296 | 6/2001 | |
| JP | 2002-147558 | 5/2002 | |
| JP | 2002-250421 | 6/2002 | |
| JP | 2002-291272 | 10/2002 | |
| JP | 2002-307956 | 10/2002 | |
| JP | 2002-533626 | 10/2002 | |
| JP | EP 1251294 A2 * | 10/2002 | F16H 61/6648 |
| JP | 2002-372114 | 12/2002 | |
| JP | 2003-028257 | 1/2003 | |
| JP | 2003-56662 | 2/2003 | |
| JP | 2003-161357 | 6/2003 | |
| JP | 2003-194206 | 7/2003 | |
| JP | 2003-336732 | 11/2003 | |
| JP | 2004-011834 | 1/2004 | |
| JP | 2004-162652 | 6/2004 | |
| JP | 2004-189222 | 7/2004 | |
| JP | 2004-526917 | 9/2004 | |
| JP | 2004-301251 | 10/2004 | |
| JP | 2005-003063 | 1/2005 | |
| JP | 2005-188694 | 7/2005 | |
| JP | 2005-240928 | 9/2005 | |
| JP | 2005-312121 | 11/2005 | |
| JP | 2006-015025 | 1/2006 | |
| JP | 2003-194207 | 10/2006 | |
| JP | 2006-283900 | 10/2006 | |
| JP | 2006-300241 | 11/2006 | |
| JP | 2007-321931 | 12/2007 | |
| JP | 2008-002687 | 1/2008 | |
| JP | 2010-069005 | 4/2010 | |
| KR | 10-2002-0071699 | 9/2002 | |
| NE | 98467 | 7/1961 | |
| TW | 74007 | 1/1984 | |
| TW | 175100 | 12/1991 | |
| TW | 218909 | 1/1994 | |
| TW | 227206 | 7/1994 | |
| TW | 275872 | 5/1996 | |
| TW | 360184 | 6/1999 | |
| TW | 366396 | 8/1999 | |
| TW | 510867 | 11/2002 | |
| TW | 512211 | 12/2002 | |
| TW | 582363 | 4/2004 | |
| TW | 590955 | 6/2004 | |
| TW | I225129 | 12/2004 | |
| TW | I225912 | 1/2005 | |
| TW | I235214 | 1/2005 | |
| TW | M294598 | 7/2006 | |
| TW | 200637745 | 11/2006 | |
| WO | WO 99/08024 | 2/1999 | |
| WO | WO 99/20918 | 4/1999 | |
| WO | WO 01/73319 | 10/2001 | |
| WO | WO 03/100294 | 12/2003 | |
| WO | WO 2005/083305 | 9/2005 | |
| WO | WO 2005/108825 | 11/2005 | |
| WO | WO 2005/111472 | 11/2005 | |
| WO | WO 2006/091503 | 8/2006 | |
| WO | WO 2008/078047 | 7/2008 | |
| WO | WO 2008/100792 | 8/2008 | |
| WO | WO 2010/017242 | 2/2010 | |
| WO | WO 2010/135407 | 11/2010 | |
| WO | WO 2011/101991 | 8/2011 | |
| WO | WO 2011/121743 | 10/2011 | |
| WO | WO 2012/030213 | 3/2012 | |
| WO | WO 2014/186732 | 11/2014 | |

OTHER PUBLICATIONS

Office Action dated Feb. 17, 2010 from Japanese Patent Application No. 2009-294086.
Office Action dated Jan. 3, 2012 for U.S. Appl. No. 12/306,393.
Office Action dated Nov. 7, 2012 for U.S. Appl. No. 12/306,393.
Chinese Office Action dated Sep. 7, 2010 for Chinese Patent Application No. 200780030547.4.
Office Action dated Dec. 24, 2012 for Chinese Patent Application No. 201110123540.5.
European Examination Report dated Apr. 3, 2013 for European Patent Application No. 07809780.5.
Examination Report dated Sep. 12, 2012 for European Patent Application No. 07809780.5.
Summons to Oral Proceedings dated Nov. 20, 2013 for European Patent Application No. 07809780.5.
Decision to Refuse dated Feb. 21, 2014 for European Patent Application No. 07809780.5.
Office Action dated Aug. 7, 2012 for Japanese Patent Application No. 2009-518168.
Office Action dated Jun. 28, 2011 from Japanese Patent Application No. 2009-518168.
Office Action dated May 28, 2013 in Japanese Patent Application No. 2012-095839.
Office Action dated Feb. 18, 2014 in Japanese Patent Application No. 2012-095839.
Office Action dated Jul. 29, 2014 in Japanese patent application No. 2013-199447.
International Search Report for International Application No. PCT/US07/14510 dated Sep. 23, 2008.
Taiwanese Preliminary Notice of First Office Action dated Mar. 13, 2013 for Taiwan Patent Application No. 96122902.
International Search Report and Written Opinion dated Feb. 2, 2010 from International Patent Application No. PCT/US2008/068929, filed on Jan. 7, 2008.
"An Evaluation of the Morse Constant Speed Accessory Drive"; Technology Assessment & Evaluation Branch, Office of Mobile Source Air Pollution Control, US EPA; Jun. 1976.
Masashi, U., et al, "Continuously Variable Transmission for Accessory Drive System", 1999 Proceedings. JSAE Annual Congress.
Thomassy: An Engineering Approach to Simulating Traction EHL. CVT-Hybrid International Conference Mecc/Maastricht/The Netherlands, Nov. 17-19, 2010, p. 97.
Van der Iieijaen, A.C., "Continuously Variable Accessory Drive and other methods to reduce additional fuel consumption caused by engine accessories"; Technische Universiteit Eindhoven Department Mechanical Engineering; Eindhoven, Jul. 2004.
Office Action dated Sep. 4, 2014 in U.S. Appl. No. 13/934,963.
Chinese Office Action dated Mar. 4, 2013 for Chinese Patent Application No. 201110123521.2.
Chinese Office Action dated Jan. 6, 2013 for Chinese Patent Application No. 201110123512.3.
Office Action dated May 12, 2015 in Japanese Patent Application No. 2013-199447.
Reexamination Report dated Dec. 4, 2015 in Japanese Patent Application No. 2013-199447.
Appeal Decision dated Jun. 14, 2016 in Japanese Patent Application No. 2013-199447.
Office Action dated Sep. 6, 2016 in Japanese Patent Application No. 2015-179195.

* cited by examiner

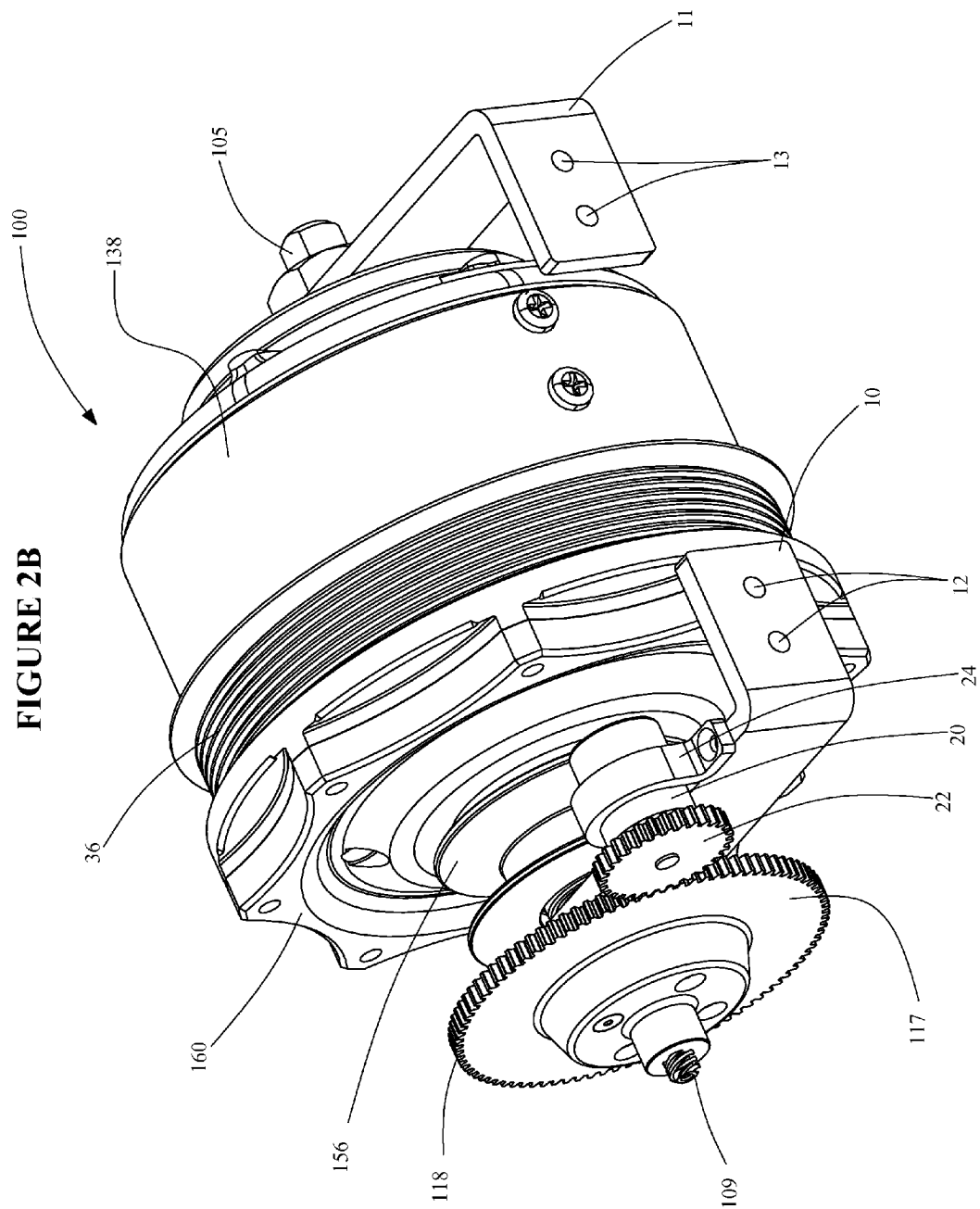

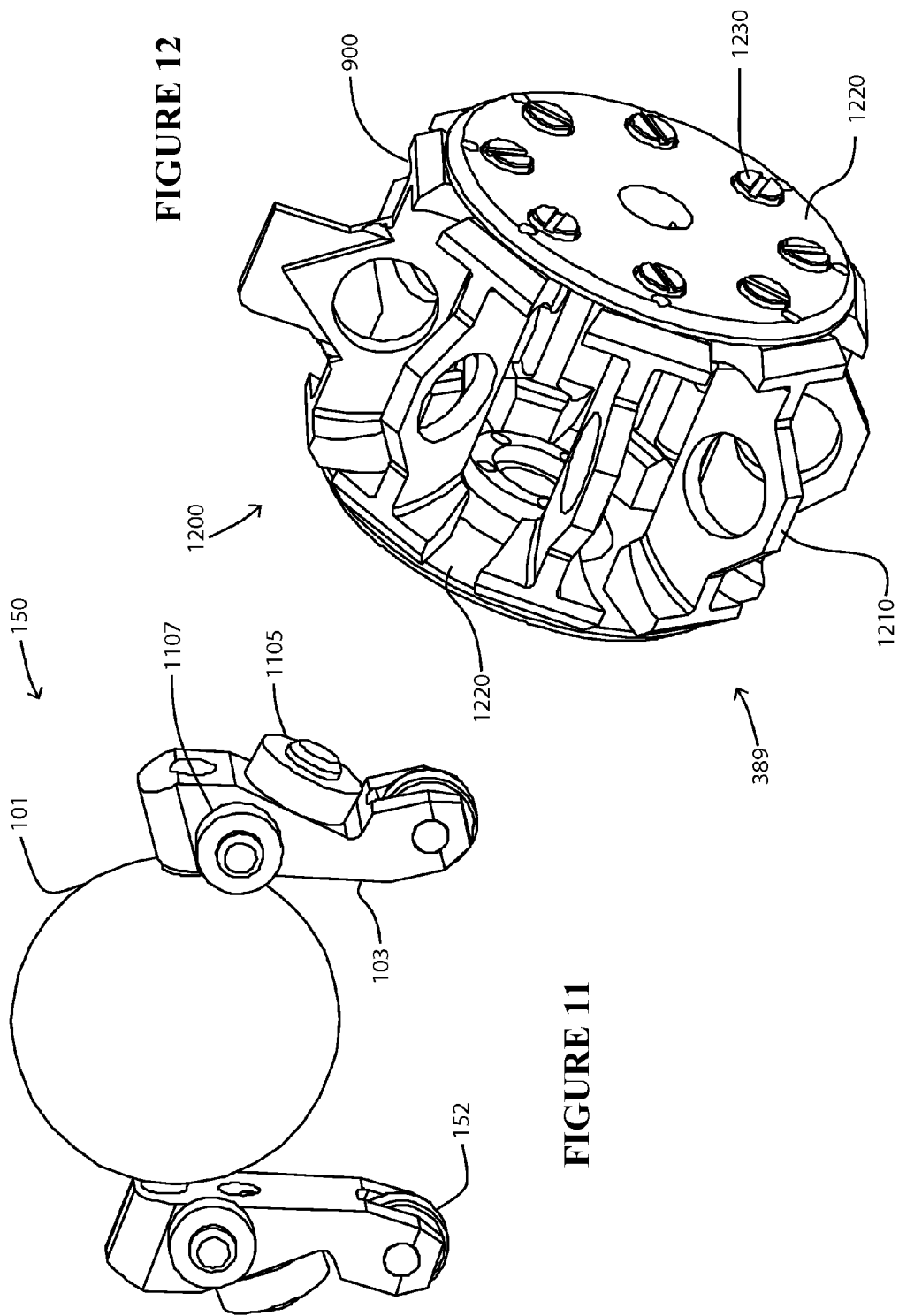

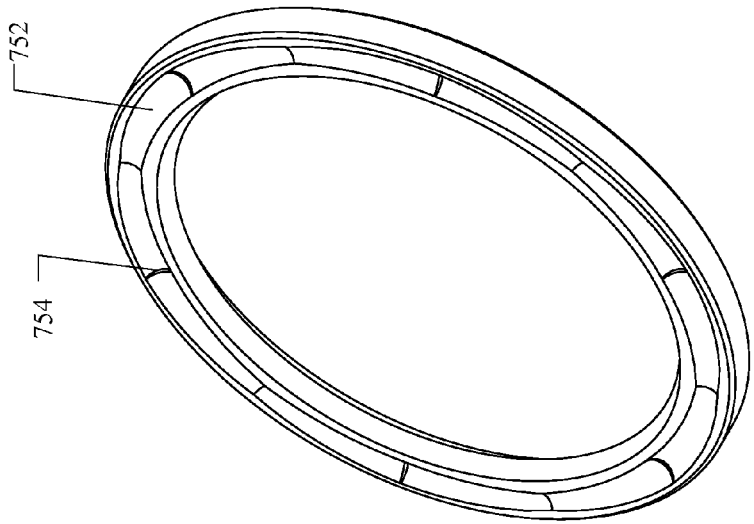
FIGURE 25
FIGURE 24
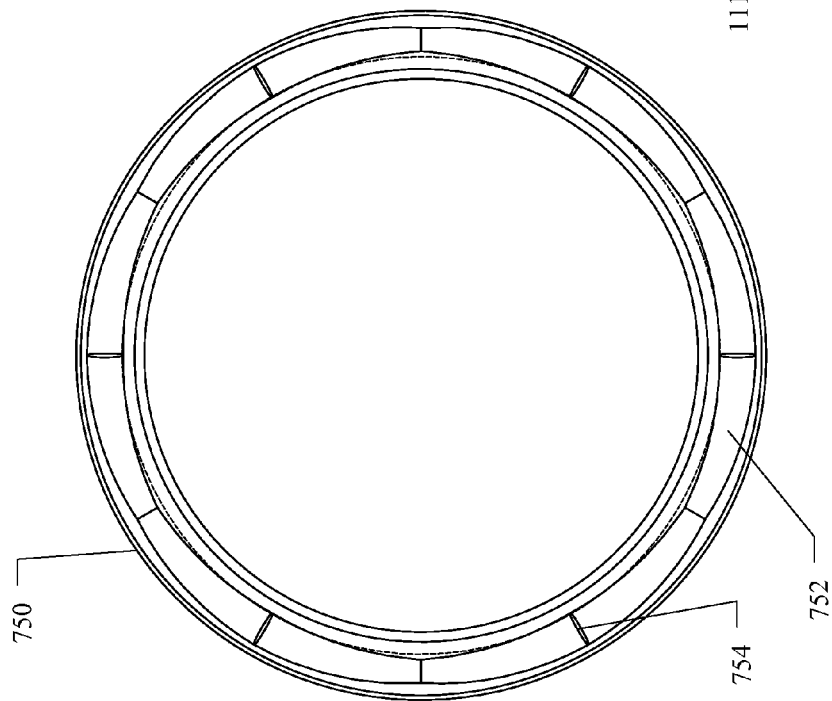
FIGURE 23

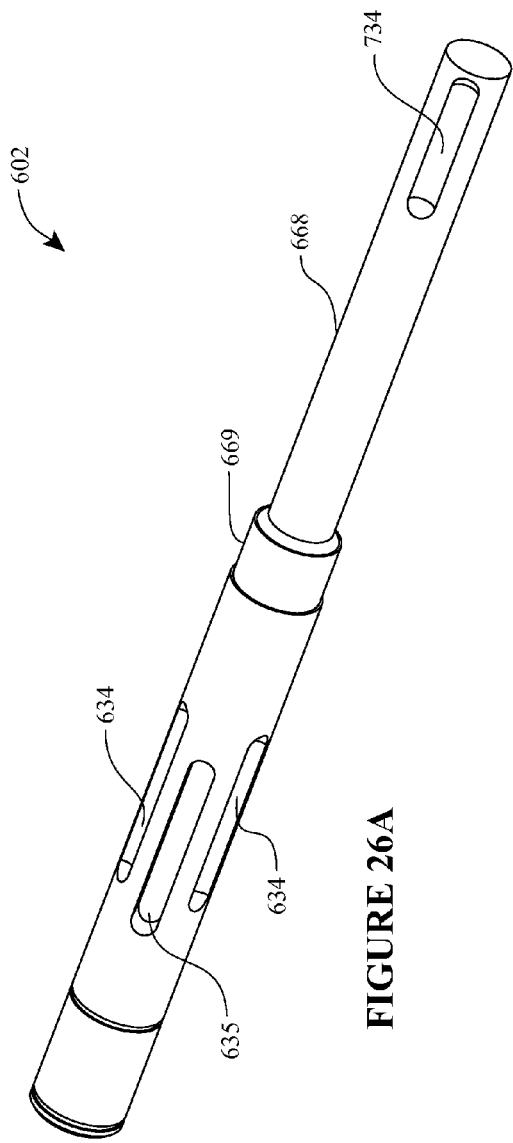
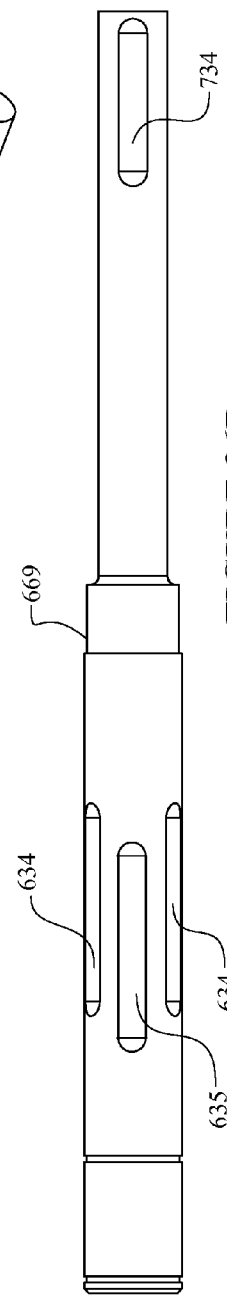
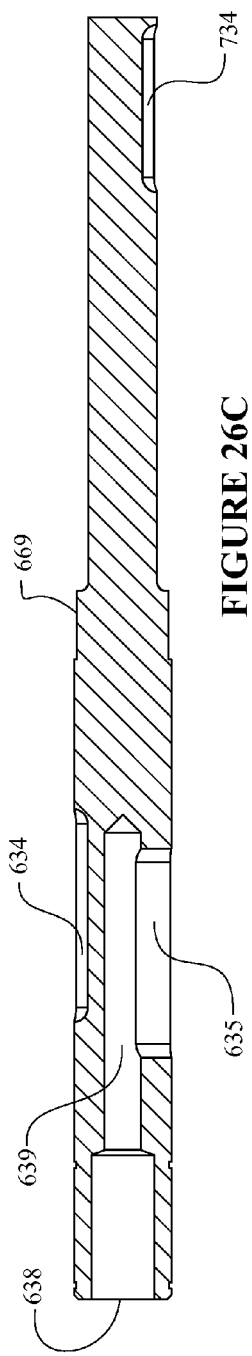
FIGURE 26A
FIGURE 26B
FIGURE 26C

CONTINUOUSLY VARIABLE TRANSMISSION

RELATED APPLICATIONS

This application is a continuation of U.S. application Ser. No. 13/934,963, filed Jul. 3, 2013 and scheduled to issue as U.S. Pat. No. 9,017,207 on Apr. 28, 2015, which is a continuation of U.S. application Ser. No. 12/306,393, filed Jul. 20, 2009 and issued as U.S. Pat. No. 8,480,529 on Jul. 9, 2013, which is a national phase application of Application No. PCT/US2007/014510, filed Jun. 21, 2007, which claims the benefit of U.S. Provisional Application No. 60/816,713, filed Jun. 26, 2006. The disclosures of all of the above-referenced prior applications, publications, and patents are considered part of the disclosure of this application, and are incorporated by reference herein in their entirety.

BACKGROUND OF THE INVENTION

Field of the Invention

The field of the invention relates generally to mechanical and/or electro-mechanical power modulation devices and methods, and more particularly to continuously and/or infinitely variable, planetary power modulating devices and methods for modulating power flow in a power train or drive, such as power flow from a prime mover to one or more auxiliary or driven devices.

Description of the Related Art

In certain systems, a single power source drives multiple devices. The power source typically has a narrow operating speed range at which the performance of the power source is optimum. It is preferred to operate the power source within its performance optimizing operating speed range. A driven device typically also has a narrow operating speed range at which the performance of the driven device is optimum. It is also preferred to operate the driven device within its performance optimizing operating speed range. A coupling is usually employed to transfer power from the power source to the driven device. Where a direct, non-modulating coupling couples the power source to the driven device, the driven device operates at the same speed as the power source. However, it is often the case that the optimum operating speed of the driven device is not the same as the optimum operating speed of the power source. Therefore, it is preferred to incorporate into the system a coupling adapted to modulate between the speed of the power source and the speed of the driven device.

Couplings between the power source and the driven devices can be selected such that the input speed from the power source is reduced or increased at the output of a given coupling. However, in frequently implemented systems, typical known power train configurations and/or coupling arrangements allow at best for a constant ratio between the input speed from the power source and the speed of power transfer to the driven device. One such system is the so-called front end accessory drive (FEAD) system employed in many automotive applications. In a typical FEAD system, the prime mover (usually an internal combustion engine) provides the power to run one or more accessories, such as a cooling fan, water pump, oil pump, power steering pump, alternator, etc. During operation of the automobile, the accessories are forced to operate at speeds that have a fixed relationship to the speed of the prime mover. Hence, for example, as the speed of the engine increases from 800 revolutions per minute (rpm) at idle to 2,500 rpm at cruising speed, the speed of each accessory driven by the engine increases proportionally to the increase in engine speed, such that some accessories may be operating at varying speeds ranging between 1,600 rpm to 8,000 rpm. The result of such system configuration is that often any given accessory does not operate within its maximum efficiency speed range. Consequently, inefficiencies arise from wasted energy during operation and oversizing of the accessories to handle the speed and/or torque ranges.

Thus, there exists a continuing need for devices and methods to modulate power transfer between a prime mover and driven devices. In some systems, it would be beneficial to regulate the speed and/or torque transfer from an electric motor and/or internal combustion engine to one or more driven devices that operate at varying efficiency optimizing speeds. In some current automotive applications, there is a need for a power modulating device to govern the front end accessory drive within existing packaging limits. The inventive embodiments of power modulating devices and/or drivetrains described below address one or more of these needs.

SUMMARY OF INVENTION

The systems and methods illustrated and described herein have several features, no single one of which is solely responsible for its desirable attributes. Without limiting the scope as expressed by the description that follows, the more prominent features of some of the inventive embodiments disclosed will now be discussed briefly. After considering this discussion, and particularly after reading the section entitled "Detailed Description of the Preferred Embodiments" one will understand how the features of the systems and methods provide several advantages over known systems and methods.

One aspect of the inventive embodiments is directed to a compound power modulating device as generally shown in FIGS. 15A-20. Another feature of the inventive embodiments covers a power modulating device as generally shown in FIGS. 2A-2D, 3-4, 10, 13-14. Yet another aspect of the inventive embodiments concerns a power modulated drivetrain as generally shown in FIG. 1A, 1B, or 21-22. Inventive embodiments are also directed to devices, assemblies, sub-assemblies, components, and/or methods as generally illustrated in FIGS. 1A-27B and described in the specification.

In one embodiment, the invention relates to a front end accessory drive (FEAD), for an automotive engine having a crankshaft. The FEAD can include a power modulating device mounted on the crankshaft, wherein an accessory operationally couples to the power modulating device. The power modulating device can have a variable planetary torque/speed regulator, which in certain applications has a rotatable housing.

In other embodiments, the invention concerns a FEAD for a vehicle having a prime mover shaft. The FEAD can have a power modulating device directly coupled to the prime mover shaft. The FEAD can also include an accessory operationally coupled to the power modulating device. In certain embodiments, the power modulating device has tiltable planet-leg assemblies. The accessory can be a water pump, a cooling fan, or an air conditioning compressor, for example. The power transfer coupling can be an endless member, such as belt or a chain. In some applications, the FEAD includes a bracket for securing the power modulating device to a nonmovable member of an automobile. A control mechanism for controlling the ratio of the power modulating device can be provided. The control mechanism can include control hardware and/or software for controlling a stepper motor.

In yet another inventive embodiment, a FEAD includes a compound device and a power transfer coupling adapted to operationally couple the compound device to a prime mover. The compound device can include a starter motor, a generator, and a power modulating device, in such a manner that the starter motor, the generator, and the power modulating device are integrated into a single device. The compound device can have an electrical armature and a magnetic field; the armature and field can be arranged so that both are capable of rotating about a common axis. The FEAD can additionally have a second power transfer coupling, which is adapted to operationally couple the compound device to an accessory. The accessory can be, for example, a water pump, an air conditioning compressor, and/or a cooling fan. In some applications, the compound device has a rotatable housing. In certain embodiments, the rotatable housing can be coupled to a plurality of permanent magnets.

Another aspect of the invention is directed to a drivetrain having a prime mover coupled to a power modulating device, which is coupled to a driven device. The power modulating device can be coupled to the prime mover via, for example, a planetary gearset. The driven device can be a compressor, a valve, a pump, a fan, an alternator, or a generator. The drivetrain can include a control system coupled to the power modulating device and/or to the prime mover.

Yet one more aspect of the invention covers a drivetrain having a prime mover coupled to a plurality of power modulating devices. In some embodiments, the drivetrain includes a plurality of driven devices coupled to the plurality of power modulating devices, each driven device corresponding to a power modulating device. The prime mover can be coupled to the plurality of power modulating devices by, for example, a belt.

In some embodiments, another aspect of the invention concerns a power modulating device having a variator assembly, a cage assembly adapted to support at least part of the variator assembly, an input assembly adapted to receive torque into the power modulating device, and an output assembly adapted to transfer torque out of the power modulating device, wherein the input and output assemblies are coupled to the variator assembly. The power modulating device can include a central shaft configured to support the cage assembly, input assembly, and/or variator assembly.

Yet a different aspect of the invention is directed to a compound drive device having a sun shaft coupled to a sun. In some embodiments, the compound drive device includes a plurality of planets, each planet having a planet axle, and a control device that operationally couples the sun to the planet axles. In one embodiment, the compound drive device is provided with a traction ring coupled to the plurality of planets and one or more magnets coupled to the traction ring. The compound drive device can include an electrical armature electromagnetically coupled to the one or more magnets, as well as a power transfer coupling that couples the electrical armature to the sun shaft.

One aspect of the invention concerns a power modulating device having a plurality of spherical planets in contact with a sun, an electrical armature operably coupled to the sun, an electrical field mounted coaxially about and concentrically with the electrical armature, and first and second traction rings in contact with the plurality spherical planets. In some embodiments, the electrical armature and the electrical field are configured such that both the electrical armature and the electrical field are capable of rotation about an axis that is coaxial with the electrical armature. In one embodiment, the power modulating device include a sun shaft capable of axial movement and configured to actuate the sun to thereby facilitate a shift of the transmission ratio of the power modulating device. The power modulating device can be provided with a shift screw mounted to a non-moving structure and with a shift nut threaded on the shift screw, wherein the shift nut is adapted to cause the sun shaft to move axially.

Yet another aspect to the invention is directed to an apparatus for shifting the transmission ratio of a power modulating device. The apparatus includes a shift nut threaded on a shift screw, which is mounted to a non-moving structure. The shift nut is preferably adapted to cause a sun shaft of the power modulating device to move axially.

An additional aspect the invention relates to a shaft for transferring torque in a power modulating device. In one embodiment, the shaft includes first and second plurality of grooves parallel to the main axis of the shaft, the first and second plurality of grooves formed on an exterior surface of the shaft. The second plurality of grooves is preferably located at an end of the shaft distal from the first plurality of grooves. In some embodiments, the shaft is provided with a sun seat for receiving and coupling to a sun of the power modulating device. In one embodiment, the shaft has a shaft hole formed generally within and concentrically with the shaft.

Another aspect of the invention is directed to a drivetrain having an accessory coupled to a power modulating device, which has a plurality of tiltable, spherical planets. In one embodiment, the drivetrain includes a motor coupled to the power modulating device for adjusting a transmission ratio of the power modulating device. In some embodiments, the drivetrain has a controller for controlling the motor. In one embodiment, the power modulating device of the drivetrain is provided with a sun shaft adapted to move axially as the motor adjusts the ratio of the power modulating device.

These and other inventive aspects will become apparent to those of ordinary skill in the relevant technology as they read the following detailed description and view the corresponding figures.

BRIEF DESCRIPTION OF THE DRAWINGS

The accompanying figures, which are incorporated in and form a part of the specification, illustrate certain features of the inventive embodiments.

FIG. 2B is a perspective view of the PMD of FIG. 2A.

FIG. 11 is a perspective view of a planet-leg assembly for use in a PMD.

FIG. 12 is a perspective view of a cage that can be used in a ball-type PMD.

FIG. 23 is a front view of an alternative traction ring of the PMD of FIG. 13.

FIG. 24 is a cross-sectional view of the traction ring of FIG. 23.

FIG. 25 is a perspective view of the traction ring of FIG. 23.

FIG. 26A is a perspective view of a shaft as can be used with the compound device of FIG. 15B.

FIG. 26B is a top, plan view of the shaft of FIG. 26A.

FIG. 26C is a cross-sectional view of the shaft of FIG. 26A.

DETAILED DESCRIPTION OF THE PREFERRED EMBODIMENTS

Figure 1A:
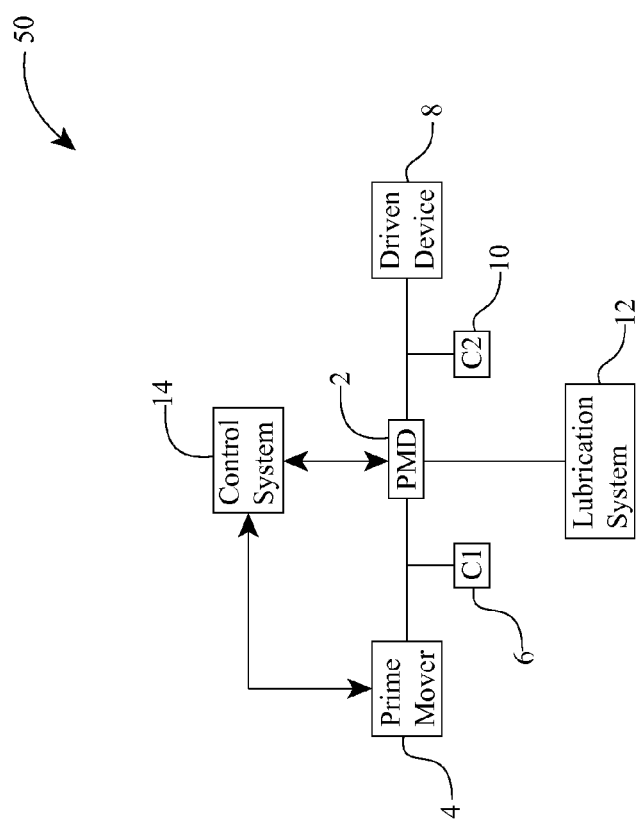
FIG. 1A is a schematic block diagram of a drivetrain that incorporates a power modulating device (PMD).

The preferred embodiments will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the terms indicate that the actual linkage or coupling may take a variety of forms, which in certain instances will be obvious to a person of ordinary skill in the technology. For description purposes, the term "radial" is used here to indicate a direction or position that is perpendicular relative to a longitudinal axis of a transmission or continuous variator. The term "axial" as used here refers to a direction or position along an axis that is parallel to a main or longitudinal axis of a transmission or continuous variator.

Inventive embodiments of power modulating devices, or torque and speed regulators, described here relate generally to continuously variable transmission (CVT) devices such as those disclosed in U.S. Pat. Nos. 6,241,636; 6,419,608; 6,689,012, and 7,011,600; and U.S. patent application Ser. No. 11/243,484 with Patent Application Publication No. 2006/0084549A1. The entire disclosure of each of these patents and application is hereby incorporated herein by reference. Certain inventive embodiments described below incorporate spherical-type variators that use spherical speed adjusters, each of which typically has a tiltable axis of rotation. The speed adjusters are also known as power adjusters, balls, planets, sphere gears or rollers. Usually, the adjusters are arrayed radially in a plane perpendicular to a longitudinal axis of a CVT. Traction rings, one on each side of the array of power adjusters, contact the power adjusters and one or both of the traction rings apply a clamping contact force to the rollers for transmission of torque from a traction ring, through the power adjusters, to the other traction ring. A first traction ring applies input torque at an input rotational speed to the rollers. As the rollers rotate about their own axes, the rollers transmit the torque to a second traction ring at an output rotational speed. The ratio of input rotational speed to output rotational speed ("speed ratio") is a function of the ratio of the radii of the contact points of the first and second traction rings, respectively, to the rotational axes of the rollers. Tilting the axes of the rollers with respect to the axis of the CVT adjusts the speed ratio.

One aspect of the torque/speed regulating devices disclosed here relates to drive systems wherein a prime mover drives various driven devices. The prime mover can be, for example, an electrical motor and/or an internal combustion engine. For purposes of description here, an accessory includes any machine or device that can be powered by a prime mover. For purposes of illustration and not limitation, said machine or device can be a power takeoff device (PTO), pump, compressor, generator, auxiliary electric motor, etc. Accessories may also include alternators, water pumps, power steering pumps, fuel pumps, oil pumps, air conditioning compressors, cooling fans, superchargers, and any other device that is typically powered by an automobile engine. As previously stated, usually, the speed of a prime mover varies as the speed or power requirements change; however, in many cases the accessories operate optimally at a given, substantially constant speed. Embodiments of the torque/speed regulating devices disclosed here can be used to control the speed of the power delivered to the accessories powered by a prime mover.

For example, in some embodiments, the speed regulators disclosed here can be used to control the speed of automotive accessories driven by a pulley attached to the crankshaft of an automotive engine. Usually, accessories must perform suitably both when the engine idles at low speed and when the engine runs at high speed. Often accessories operate optimally at one speed and suffer from reduced efficiency at other speeds. In many cases when the engine runs at a speed other than low speed, accessories consume excess power and, thereby, reduce vehicle fuel economy. The power drain caused by the accessories also reduces the engine's ability to power the vehicle, necessitating a larger engine in some cases.

In certain situations, inventive embodiments of the torque/speed regulating devices disclosed here can be used to increase speed to the accessories when the engine runs at low speed and to decrease speed to the accessories when the engine runs at high speed. Thus, the design and operation of accessories can be optimized by allowing the accessories to operate at one, substantially favorable speed, and the accessories need not be made larger than necessary to provide sufficient performance at low engine speeds. The accessories can also be made smaller because the torque/speed regulating devices can reduce speed to the accessories when the engine runs at high speed, reducing the stress load the accessories must withstand at high rpm. Because the accessories are not subjected to high speeds, their expected service life can increase substantially. In some cases, smoother vehicle operation results because the accessories do not have to run at low or high speed. Further, an automobile can operate more quietly at high speed because the accessories run at a lower speed.

The torque/speed regulators disclosed here can facilitate reducing the size and weight of the accessories as well as the automobile engine, thereby reducing the weight of the vehicle and thus increasing fuel economy. Further, in some cases, the option to use smaller accessories and a smaller engine lowers the cost of these components and of the automobile. Smaller accessories and a smaller engine can also provide flexibility in packaging and allow the size of the engine compartment to be reduced. Embodiments of the torque/speed regulators described here can also increase fuel economy by allowing the accessories to operate at their most efficient speed across the engine operating range. Finally, the torque/speed regulators increase fuel economy by preventing the accessories from consuming excess power at any engine speed other than low.

Turning now to FIG. 1A, it shows a generalized drivetrain 50 that includes a power modulating device 2 (or PMD 2) in accordance with inventive embodiments described here. The drivetrain 50 can include at least one prime mover 4 that is coupled to the PMD 2 via a first coupling 6. Usually the PMD 2 is adapted to deliver power to a driven device 8 via a second coupling 8. In some embodiments, a lubrication system 12 couples to, or is integrated with, the PMD 2. Typically, the drivetrain 50 can include a control system 14 that couples to the PMD 2 and/or the prime mover 4.

The prime mover 4 can be, for example, an internal combustion engine, an electric motor, or a combination of both. In certain applications, the prime mover 4 can be a human powered mechanical linkage; in other embodiments, the prime mover 4 can be a power assisted, human driven device. Depending on the application, the first and second couplings 6, 10 can be any type coupling ranging from a spline, key, or flange coupling to a single planetary gearset, to a gearbox having multiple planetary gearsets and other gears in parallel or serial arrangements. In certain embodiments, one or both of the couplings 6, 10 might not be used, in which case the PMD 2 couples directly to the prime mover 4 or the driven device 8. The driven device 8 can be any machine or equipment adapted to receive a torque input from the PMD 2 and/or the second coupling 10. The driven device 8 can be, for example, a compressor, a valve, a pump, a fan, an alternator of a vehicle, a generator, etc.

The lubrication system 12 in some embodiments is a lubricant adapted to coat and/or cool various components of the PMD 2. In other embodiments, the lubrication system includes components configured to facilitate and promote the routing of lubricants throughout the PMD 2. For example, as will be described in more detail below, in one embodiment the lubrication system 12 includes a scraper that guides lubricant from internal surfaces of the PMD 2 to other internal components of the PMD 2. In yet other embodiments, the lubrication system 12 can include a pump-controlled hydraulic circuit configured to deliver appropriate quantities of lubricant to various internal components of the PMD 2. In certain embodiments of the drivetrain 50, the control system 14 can be an electronic, mechanical, or electromechanical device for communicating with and controlling the PMD 2, the prime mover 4, and/or the lubrication system 12. In one embodiment, for example, the control system 14 can be an electromechanical system having a motor controller with logic for actuating a motor that in turn actuates one or more mechanical gears, linkages, etc., to cause a state change (such as ratio shift) in the PMD 2.

During operation of the drivetrain 50, the prime mover 4 generates and delivers power at certain torque and speed levels, which depend on, among other things, various load requirements placed on the prime mover 4. The control system 14 is actuated in such a manner that that the PMD 2 receives power from the prime mover 4 and delivers power to the driven device 8 at a desired (or modulated) torque and speed level, which torque and speed level need not be the same as the torque and speed level at which the prime mover 4 may be operating. In some applications, it is desired to control the PMD 2 such that the PMD 2 delivers power to the driven device at a constant speed, even while the PMD 2 is receiving power from the prime mover 4 at fluctuating torque and speed levels.

Figure 1B:
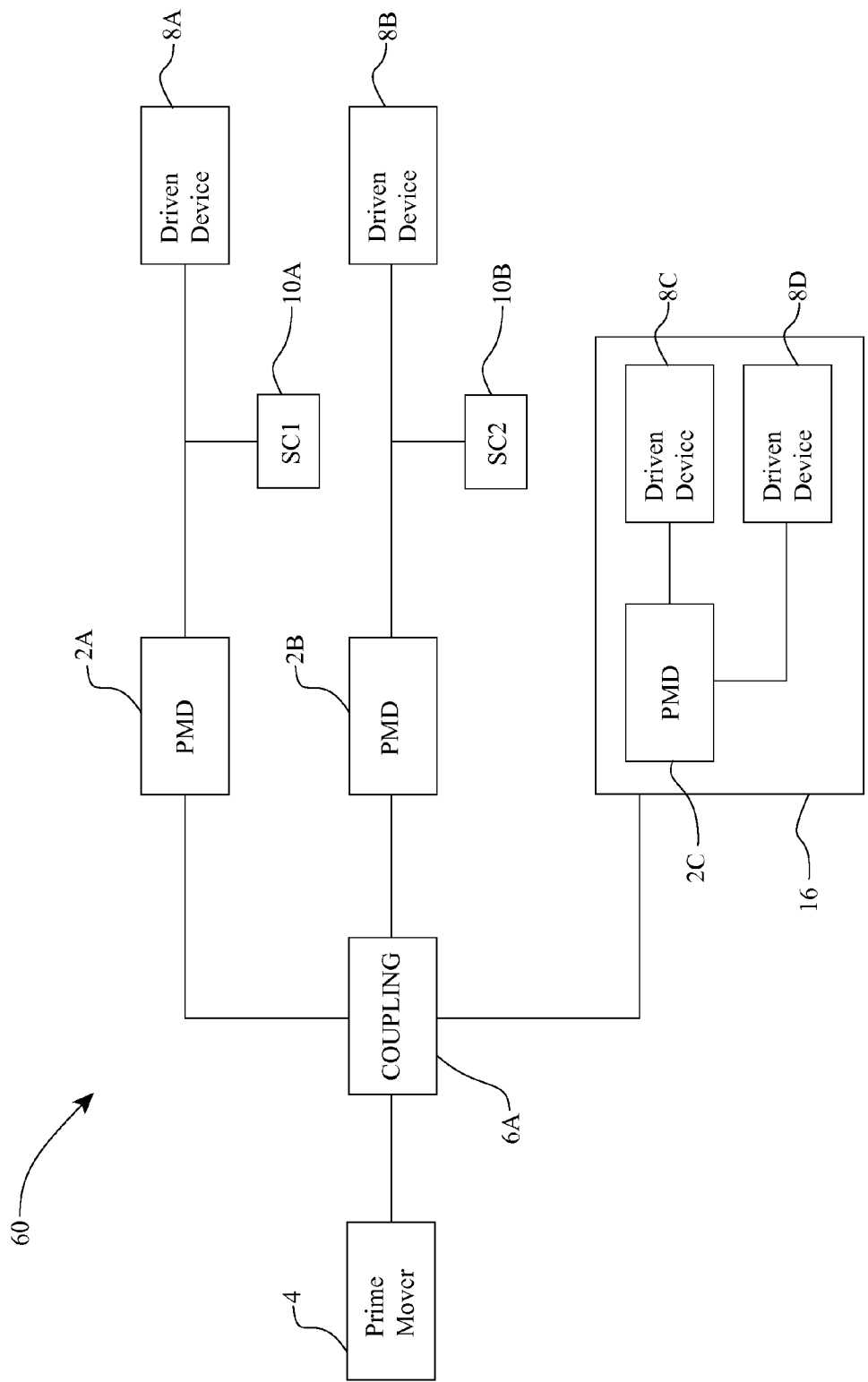
FIG. 1B is a schematic block diagram of yet another drivetrain that incorporates PMDs.

Referencing FIG. 1B now, a drivetrain 60 is illustrated. In some embodiments, the drivetrain 60 can include a prime mover 4 coupled to one or more PMDs 2A, 2B, and 2C via one or more couplings 6A. In the embodiment shown, a PMD 2A couples to a driven device 8A via a secondary coupling 10A, while a PMD 2B couples to a driven device 8B via a secondary coupling 10B. In some embodiments, the prime mover 4 couples via the coupling 6A to compound device 16, which can include at least one PMD 2C coupled to a driven device 8C and a driving/driven device 8D. In one embodiment of the drivetrain 60, the coupling 6A includes a pulley that drives a belt which in turn drives one or more of the PMDs 2A, 2B, and 2C. In some embodiments, the secondary couplings 10A, 10B can be, for example, a sprocket driving a chain or a pulley driving a belt. Said chain and belt, respectively, drive a corresponding sprocket or pulley coupled to the respective driven devices 8A, 8B. Thus, in one embodiment of the drivetrain 60, a power modulating device can be dedicated to each of the driven devices present in the drivetrain 60. Although not shown, each of the PMDs 2A, 2B, 2C can have its own control system 14 and/or lubrication system 12. In yet other embodiments, the compound device 16 can be a PMD 2C coupled to, or integrated with, an alternator and/or a starter motor. In one embodiment, for example, the compound device integrates the PMD 2C with a cooling fan and/or a water pump of a vehicle. It will be apparent to persons of ordinary skill in the technology that other combinations, or integrations, of driving/driven devices with a PMD 2C are feasible and desirable.

Figure 2A:
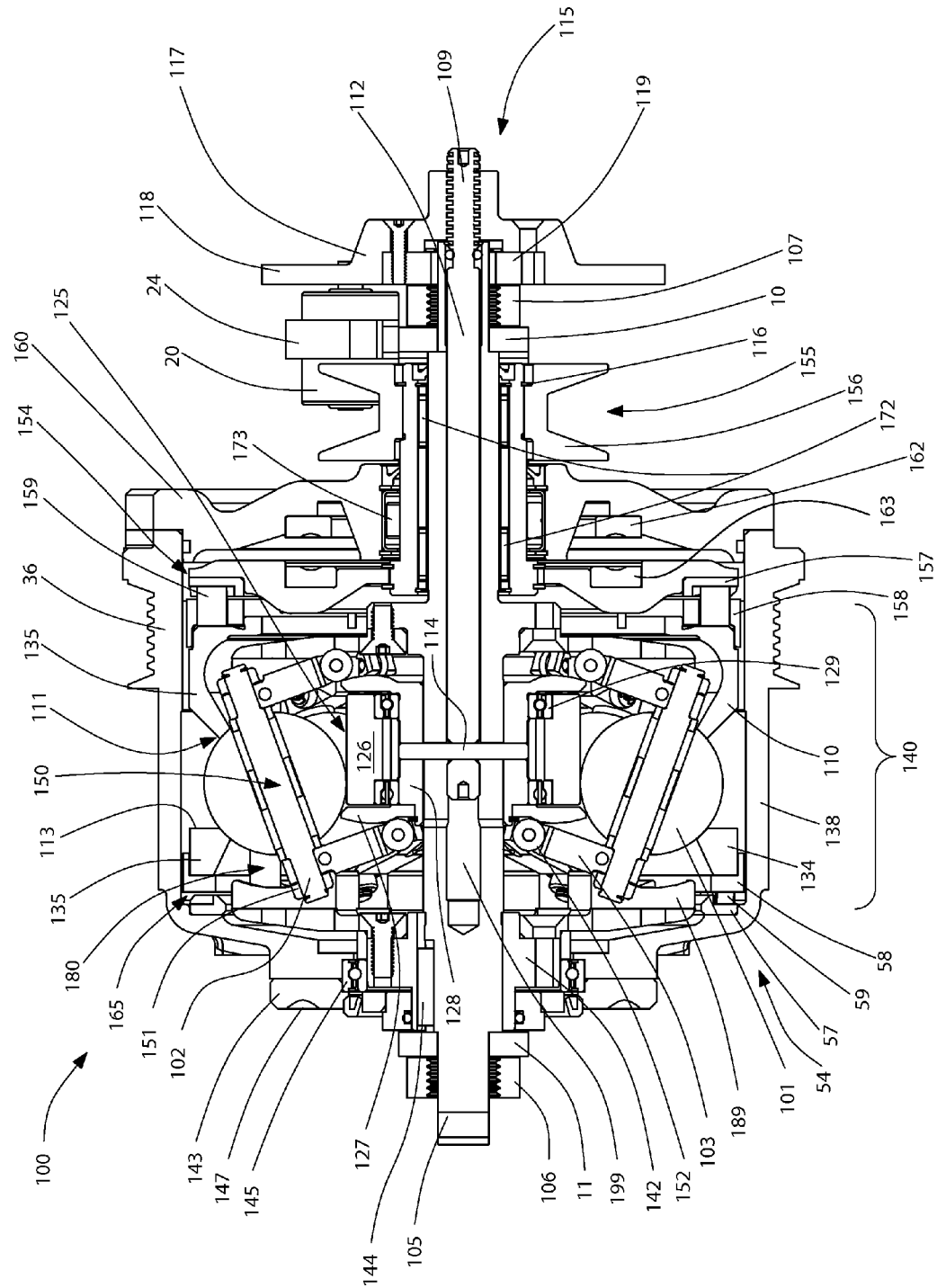
FIG. 2A is a cross-sectional view of one embodiment of a PMD.

Referring to FIG. 2A now, one embodiment of a continuously variable planetary torque/speed regulator 100 (hereinafter referred to as the power modulating device 100 or the PMD 100) that can change input to output speed/torque ratios is shown. In some embodiments, the PMD 100 has a central shaft 105 that extends through the center of the PMD 100 and beyond a first mounting bracket 10 and a second mounting bracket 11. For purposes of description, the central shaft 105 defines a longitudinal axis of the PMD 100 that will serve as a reference point for describing the location and or motion of other components of the PMD 100. As used here, the terms "axial," "axially," "lateral," "laterally," refer to a position or direction that is coaxial or parallel with the longitudinal axis defined by the central shaft 105. The terms "radial" and "radially" refer to locations or directions that extend perpendicularly from the longitudinal axis defined by the central shaft 105. In certain embodiments, the first and/or second mounting brackets 11, 12 are adapted to be removable. A first end nut 106 and a second end nut 107, each located at a corresponding end of the central shaft 105, attach the central shaft 105 to the mounting brackets 10, 11. The embodiment illustrated of the PMD 100 is adapted for use attached to an automobile engine crankshaft to control the speed of the accessories of, for example, a front end accessory drive system (FEAD); however, the PMD 100 can be implemented on any equipment or vehicle that makes use of a torque/speed regulating device. The central shaft 105 provides radial and lateral support for a cage assembly 180, an input assembly 155, and an output assembly 165. In this embodiment the central shaft 105 includes a bore 199 adapted to house a shift rod 112. As will be described later, the shift rod 112 actuates a speed ratio shift in the PMD 100.

The PMD 100 includes a variator assembly 140. The variator assembly 140 can be any mechanism adapted to change the ratio of input speed into the PMD 100 to output speed out of the PMD 100. In one embodiment, the variator assembly 140 includes a first traction ring 110, a second traction ring 134, tiltable planet-leg assemblies 150, and a sun assembly 125. The first traction ring 110 may be a ring mounted rotatably and coaxially about the central shaft 105. At the radial outer edge of the first traction ring 110, the traction ring 110 extends at an angle and terminates at a contact surface 111. In some embodiments, the contact surface 111 can be a separate structure, for example a ring that attaches to the first traction ring 110, which would provide support for the contact surface 111. The contact surface 111 may be threaded, or press fit, into the first traction ring 110 or it can be attached with any suitable fasteners or adhesives. Hence, in some embodiments, the traction rings 110, 134 are generally ring shaped components that contact an array of planets 101. In some embodiments, the traction rings 110, 134 have support structures 113 that extend radially outward from contact surfaces 111 and that provide structural support to increase radial rigidity, to resist compliance of those parts under the axial force of the PMD 100, and to allow axial force components to move radially outward, thereby reducing the axial length of the PMD 100.

In some embodiments, the PMD 100 includes a case 138 that is a generally cylindrical tube rotatable about the central shaft 105. The case 138 has an inside that houses most of the components of the PMD 100 and an outside adapted to operably connect to whatever component, equipment or vehicle uses the PMD 100. In one embodiment, the outside of the case 138 is configured as a drive for accessories in an automobile.

Figure 2C:
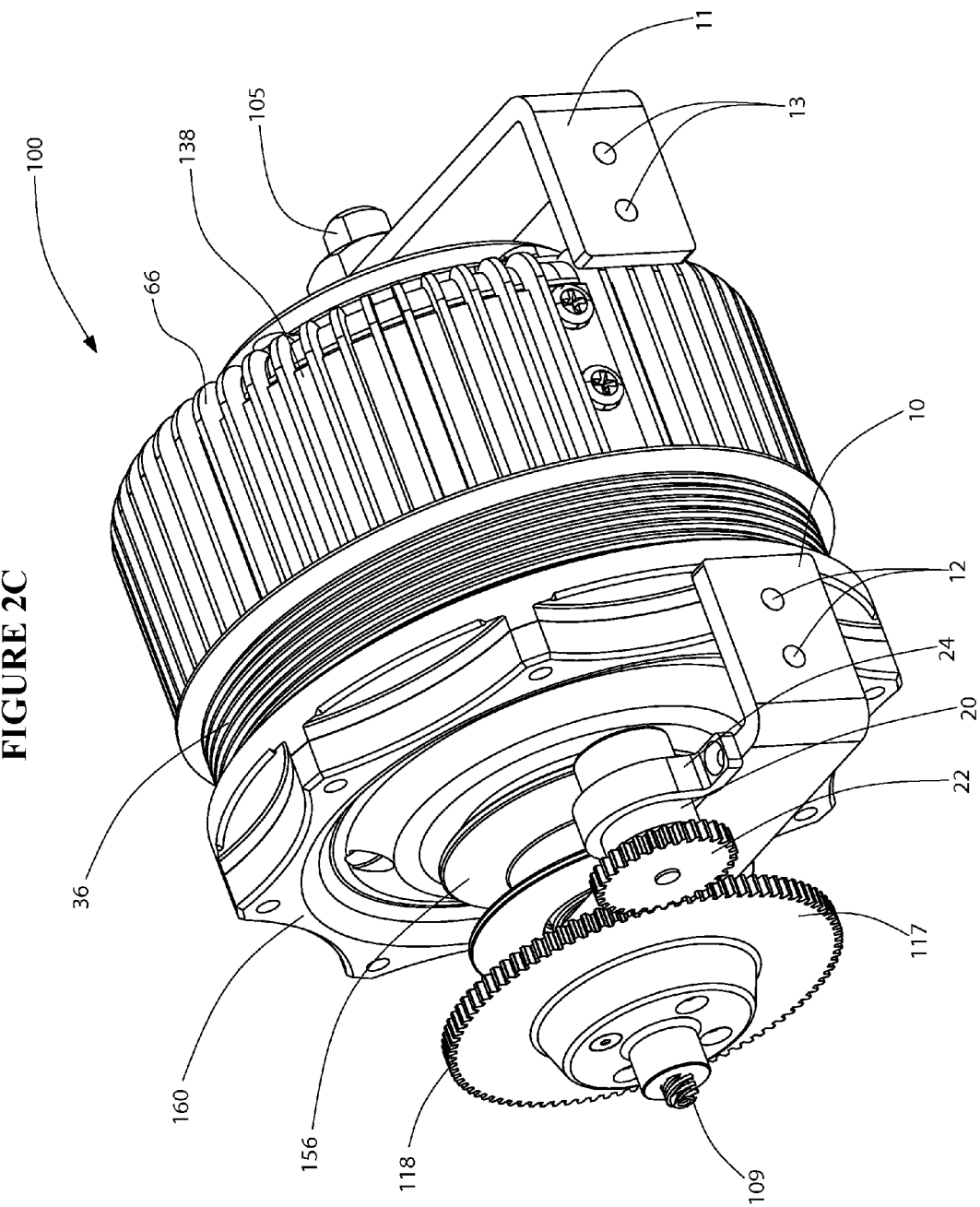
FIG. 2C is a perspective view of the PMD of FIG. 2A with cooling fins on the case.

Referring to FIG. 2C, the case 138 in some embodiments incorporates one or more cooling fins 66 radially positioned around the perimeter of the case 138. The cooling fins 66 are preferably formed from a material capable of rapid heat dissipation, such as aluminum, copper, or steel, although any suitable material can be used. In some embodiments the cooling fins 66 and the case 138 are formed as one piece, while in other embodiments the cooling fins 66 are a separate part and attach to the case 138 with standard fasteners, adhesive, an interference fit, a key, spline, weld, or any other suitable method. In some embodiments, the cooling fins 66 are formed as a tube from cast or forged aluminum and the cooling fins 66 extend radially outward from the outside diameter from the tubular portion of the cooling fins 66. Among other things, the cooling fins 66 can be adapted to radiate heat produced during operation of the PMD 100 and to facilitate air flow across the PMD 100. In some embodiments the cooling fins 66 are parallel to the axis of the central shaft 105, while in other embodiments the cooling fins 66 are configured as one or more flanges (not shown) around the outside diameter of the case 138. In still other embodiments, the cooling fins 66 are helical vanes (not shown) that can act as a fan.

Figure 2D:
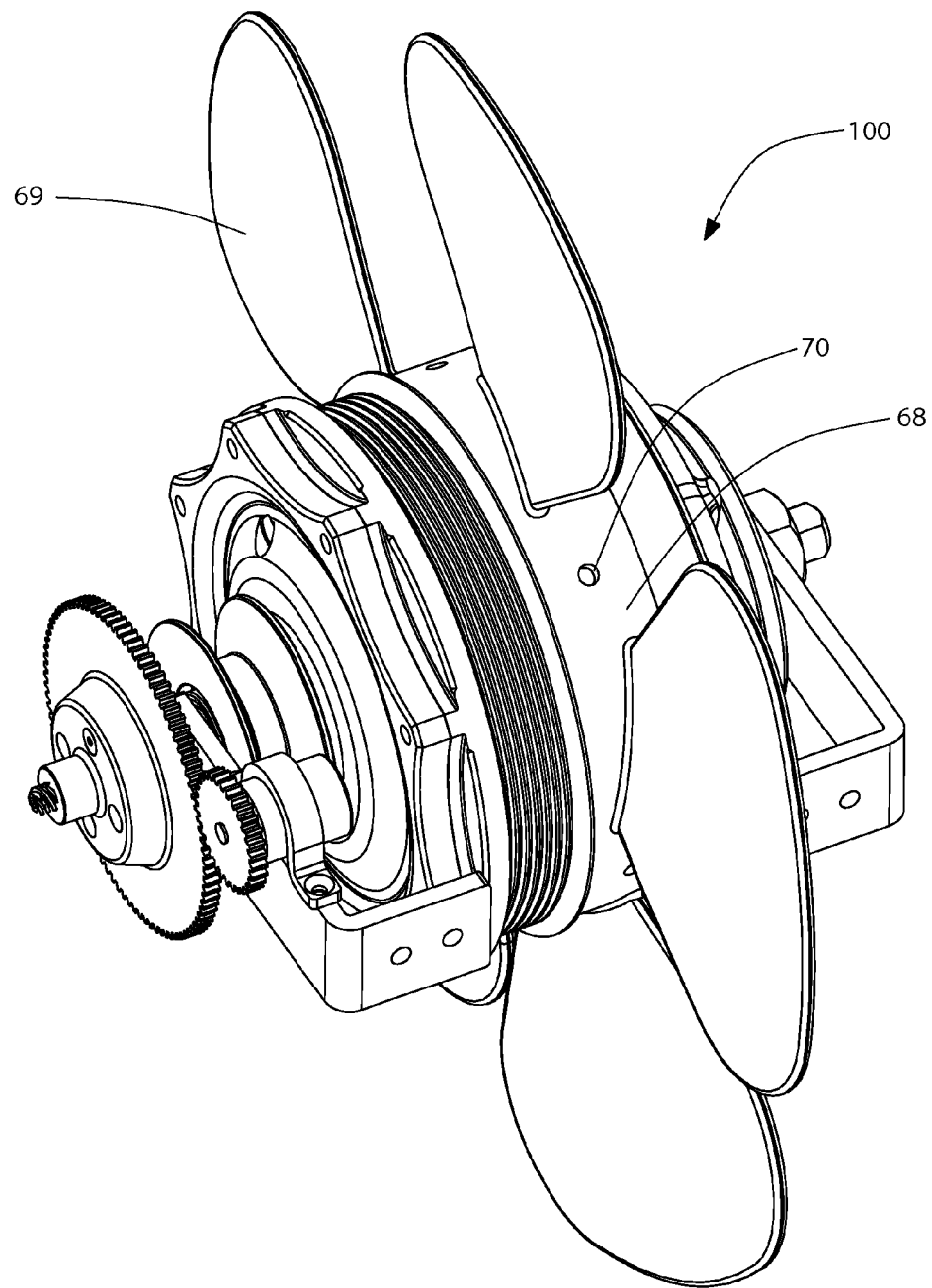
FIG. 2D is a perspective view of the PMD of FIG. 2A with a cooling fan on the case.

Referring to FIG. 2D, in some embodiments a cooling fan 68 is incorporated into the case 138. The blades 69 of the cooling fan 68 are made from a rapid heat dissipating material such as aluminum, copper, or steel in some embodiments, although other materials, such as glass filled nylon, or other plastics and composites can be used. The cooling fan 68 in some embodiments is a separate piece and rigidly attaches to the case 138 using standard fasteners inserted through holes 70 in the cooling fan 68 and threaded into corresponding holes in a case 138. In other embodiments, the cooling fan 68 can be attached with adhesive, a key, a spline, an interference fit, welding, or any other suitable method. In still other embodiments, the cooling fan 68 and the case 138 are formed as one piece. The blades 69 of the cooling fan 68 are preferably adapted to provide rapid heat dissipation from the heat produced during operation of the PMD 100 as well as promote air flow throughout the engine compartment. In some embodiments, the cooling fan 68 is adapted to pull air through the radiator, while in other embodiments the cooling fan 68 is adapted to push air throughout the engine compartment.

Referring to FIGS. 2A, 2B, 10 and 11 a PMD 100 can include a planet-leg assembly 150 for transmitting torque from the first traction ring 110 to the second traction ring 134 and varying the ratio of an input speed to an output speed. In some embodiments, the planet-leg assembly 150 includes a planet 101, a planet axle 102, and legs 103. The planet axle 102 can be a generally cylindrical shaft that extends through a bore formed through the center of the planet 101. In some embodiments, the axle 102 interfaces with the surface of the bore in the planet 101 via needle or radial bearings that align the planet 101 on the axle 102. In some embodiments, the axle 102 extends beyond the sides of the planet 101 where the bore ends so that the legs 103 can actuate a shift in the axis of rotation of the planet 101. Where the axle 102 extends beyond the edge of the planet 101, the axle 102 couples to the radial outward end of the legs 103. The legs 103 are radial extensions adapted to tilt the planet axle 102.

The axle 102 passes through a bore formed in the radially outward end of a leg 103. The leg 103 can be positioned on the axle 102 by clip rings, such as e-rings, or can be press fit onto the axle 102; however, any other type of fixation between the axle 102 and the leg 103 can be utilized. The planet-leg assembly 150 can also include skew rollers 151, which are rolling elements attached to each end of a planet axle 102 and provide for rolling contact of the axle 102 as other components of the PMD 100 align the axle 102. In some embodiments, a leg 103 is provided with a shift cam wheel 152 at a radially inward end. The shift cam wheel 152 facilitates control of the radial position of the leg 103, which controls the tilt angle of the axle 102. In yet other embodiments, the leg 103 couples to a stator wheel 1105 (see FIG. 11) that allows the leg 103 to be guided and supported in the cage assembly 180 or the stator plates 800 (see FIG. 8). As shown in FIG. 11, the stator wheel 1105 may be angled relative to the longitudinal axis of the leg 103. In some embodiments, the stator wheel 1105 is configured such that the central axis of the stator wheel 1105 intersects with the center of the planet 101.

Still referring to FIGS. 2A, 2B, 10 and 11, in various embodiments the interface between the planets 101 and the axles 102 can be any of the bearings described in other embodiments below. However, the planets 101 are fixed to the axles 102 in other embodiments and rotate with the planets 101. In some such embodiments, bearings (not shown) are positioned between the axles 102 and the legs 103 such that the transverse forces acting on the axles 102 are reacted by the legs 103 as well as, or alternatively, the cage assembly 180 (described in various embodiments below). In some such embodiments, the bearing positioned between the axles 102 and the legs 103 are radial bearings (balls or needles), journal bearings or any other type of bearings or suitable mechanism or means.

With reference to FIGS. 2A, 3, 4, and 10, the sun assembly 125 will now be described. In some embodiments, the sun assembly 125 includes a sun 126, shift cams 127, and sun bearings 129. The sun 126 is a generally cylindrical tube. In one embodiment, the sun 126 has a generally constant outer diameter; however, in other embodiments the outer diameter is not constant. The shift cams 127 are positioned on either or both ends of the sun 126 and interact with the shift cam wheels 152 to actuate the legs 103. The shift cams 127 are convex in the illustrated embodiment, but can be of any shape that produces a desired motion of the legs 103. In some embodiments, the shift cams 127 are configured such that their axial position controls the radial position of the legs 103, which governs the angle of tilt of the axles 102.

In some embodiments, the radial inner diameter of the shift cams 127 extends axially toward one another to attach one shift cam 127 to the other shift cam 127. As shown in FIG. 2A, a cam extension 128 forms a cylinder about the central shaft 105. The cam extension 128 extends from one cam 127 to the other cam 127 and is held in place there by a clip ring, a nut, or some other suitable fastener. In some embodiments, one or both of the shift cams 127 are threaded onto the cam disc extension 128 to fix them in place. In the illustrated embodiment, the convex curve of the cam 127 extends axially away from the axial center of the sun assembly 125 to a local maximum, then radially outward, and back axially inward toward the axial center of the sun assembly 125. This cam profile reduces binding that can occur during shifting of the sun assembly 125 at the axial extremes. Other cam shapes can be used as well.

In the embodiment of FIG. 2A, a shift rod 112 actuates a transmission ratio shift of the PMD 100. In one embodiment, the shift rod 112, coaxially located inside the bore 199 of the central shaft 105, is an elongated rod having a threaded end 109 that extends out one side of the central shaft 105. The other end of the shift rod 112 extends into the sun assembly 125 where it contains a shift pin 114, which mounts generally transversely in the shift rod 112. The shift pin 114 engages the sun assembly 125 so that the shift rod 112 can control the axial position of the sun assembly 125. A lead screw assembly 115 controls the axial position of the shift rod 112 within the central shaft 105. In some embodiments, the lead screw assembly 115 includes a shift actuator 117, which can have a shift gear 118 on its outer diameter and threads on a portion of its inner diameter to engage the shift rod 112. A shift bushing 119, in some embodiments constructed of a low friction material such as bronze or plastic, is a disc shaped component rotatably positioned over the central shaft 105. The shift bushing 119 may be constrained axially on the central shaft 105 by any means, and in the embodiment shown in FIG. 2A the shift bushing 119 is held in place by the end nut 107. The shift actuator 117 attaches to the shift bushing 119 using standard fasteners such as flat head screws. The shift gear 118 engages a driving gear 22 (see FIG. 2B), which in some embodiments can be actuated by a motor 20, such as an electric stepper motor. In some embodiments, the shift gear 118 is a standard spur gear, while in other embodiments the shift gear 118 can be another type of gear, such as a helical gear.

Referring to FIG. 2A and FIG. 2B, the input assembly 155 allows torque transfer into the variator assembly 140. In some embodiments, the input assembly 155 includes an input pulley 156 that converts linear motion from, for example, a belt (not shown) into rotational motion. In some embodiments, the input pulley 156 accepts torque from a belt that is operably attached to the shaft of a prime mover, such as the crankshaft of an automobile engine or motor. Although a pulley is used here, other embodiments of the PMD 100 may use a sprocket that accepts motion from a chain, for example. The input pulley 156 transmits torque to an axial force generating mechanism, which in the illustrated embodiment is a cam loader 154 that transmits the torque to the first traction ring 110. The cam loader 154 includes a first load cam ring 157, a second load cam ring 158, and a set of cam rollers 159 disposed between the load cam rings 157, 158. The cam loader 154 transmits torque from the pulley 156 to the first traction ring 110 and generates an axial force that resolves into the contact force for the first traction ring 110, the planets 101, the sun 126, and the second traction ring 134. The axial force is generally proportional to the amount of torque applied to the cam loader 154. In some embodiments, the input pulley 156 applies torque to the first load cam ring 157 via a one-way clutch (not shown) that acts as a coasting mechanism when the case 138 spins but the pulley 156 is not supplying torque. In some embodiments, the second load cam ring 158 may be integral as a single piece with the first traction ring 110.

Still referring to FIG. 2A, a second cam loader 54 can be used to optimize the axial force applied to the planets 101. In one embodiment, the second cam loader 54 is positioned between the second traction ring 134 and the case 138 and includes a load cam ring 57, a load cam ring 58, and a set of cam rollers 59 interposed between the load cam rings 57, 58.

As shown in FIGS. 2A, 2B, an end cap 160 facilitates the enclosure of the internal components of the PMD 100 within the case 138. In some embodiments, the end cap 160 is a generally flat disc that attaches to the open end of the case 138 and has a bore through the center to allow passage of the first load cam ring 157, the central shaft 105 and the shift rod 112. In some embodiments, the end cap 160 attaches to the case 138 and helps to react the axial force created by the cam loader 154. The end cap 160 can be made of any material capable of reacting the axial force such as aluminum, titanium, steel, or high strength thermoplastics or thermoset plastics. The end cap 160 fastens to the case 138 by fasteners (not shown); however, the end cap 160 can also thread into, or can otherwise be attached to, the case 138.

In one embodiment, the end cap 160 has a groove formed about a radius on its side facing the cam loader 154 that houses a preloader (not shown). The preloader can be a spring that provides and an initial clamp force at very low torque levels. The preloader can be any device capable of supplying an initial force to the cam loader 154, and thereby to the traction ring 134, such as a spring, or a resilient material like an o-ring. The preloader can be a wave-spring as such springs can have high spring constants and maintain a high level of resiliency over their lifetimes.

In some embodiments, the preloader is loaded by a thrust washer 162 and a thrust bearing 163 directly to the end cap 160. In the embodiment shown, the thrust washer 162 is a typical ring washer that covers the groove receiving the preloader and provides a thrust race for the thrust bearing 163. The thrust bearing 163 may be a needle thrust bearing that has a high level of thrust capacity, improves structural rigidity, and reduces tolerance requirements and cost when compared to combination thrust radial bearings; however, any other type of thrust bearing or combination bearing can be used. In certain embodiments, the thrust bearing 163 is a ball thrust bearing. The axial force developed by the cam loader 154 is reacted through the thrust bearing 163 and the thrust washer 162 to the end cap 160. The end cap 160 attaches to the case 138 to complete the structure of the PMD 100.

Still referring to FIG. 2A and FIG. 2B, in certain embodiments, a pulley 36 couples to the case 138. The pulley 36 can have a serpentine profile, but in other embodiments the pulley 36 can be designed to accept timing belts, V-belts, round belts, or any other type of belt. The pulley 36 can be keyed to the case 138, or the pulley 36 can be pinned, screwed, splined, welded, press fit, or attached using any method that results in a rigid connection. In some embodiments, the pulley 36 is integrally formed into the case 138 so that the pulley 36 and the case 138 are a single part.

In FIG. 2A and FIG. 2B, one or more cam disc bearings 172 hold the first load cam ring 157 in radial position with respect to the central shaft 105, while an end cap bearing 173 maintains the radial alignment between the first load cam ring 157 and the inner diameter of the end cap 160. Here the cam disc bearings 172 and the end cap bearing 173 are needle roller bearings; however, other types of radial bearings can be used as well. The use of needle roller bearings allow increased axial float and accommodates binding moments developed by the pulley 156. In other embodiments of the PMD 100 or any other embodiment described herein, each of or either of the cam disc bearings 172 and the end cap bearing 173 can also be replaced by a complimentary pair of combination radial-thrust bearings. In such embodiments, the radial thrust bearings provide not only the radial support but also are capable of absorbing thrust, which can aid and at least partially unload the thrust bearing 163.

Still referring to FIG. 2A and FIG. 2B, an axle 142, being a support member mounted coaxially about the central shaft 105 and held between the central shaft 105 and the inner diameter of the closed end of the case 138, holds the case 138 in radial alignment with respect to the central shaft 105. The axle 142 is fixed in its angular alignment with the central shaft 105. Here a key 144 fixes the axle 142 in its angular alignment, but the fixation can be by any means known to those of skill in the relevant technology. A radial hub bearing 145 fits between the axle 142 and the inner diameter of the case 138 to maintain the radial position and axial alignment of the case 138. The hub bearing 145 is held in place by an encapsulating axle cap 143. The axle cap 143 is a disc having a central bore that fits around central shaft 105 and here attaches to the case 138 with fasteners 147.

Figure 3:
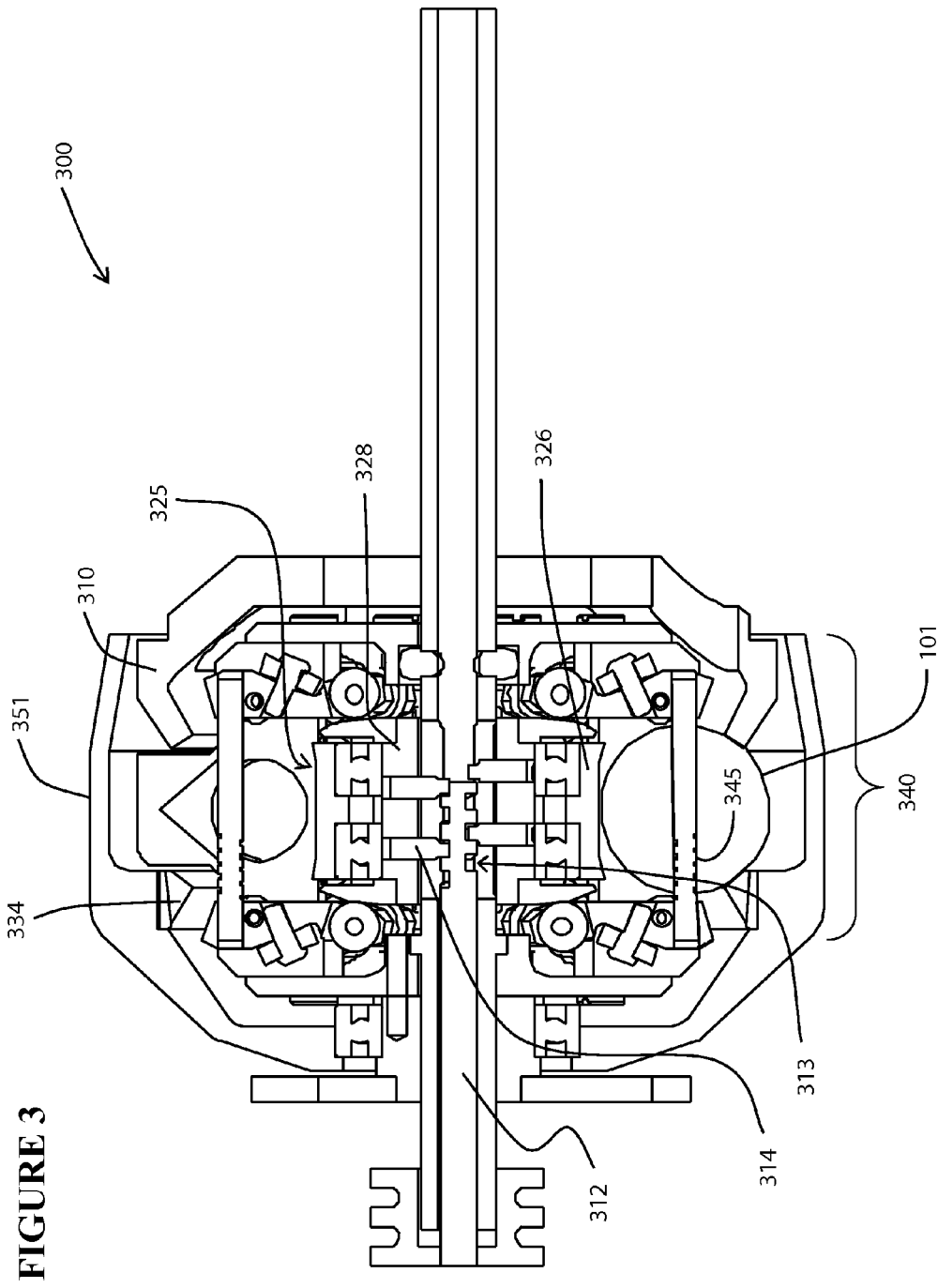
FIG. 3 is a cross-sectional view of a second embodiment of a PMD.
Figure 4:
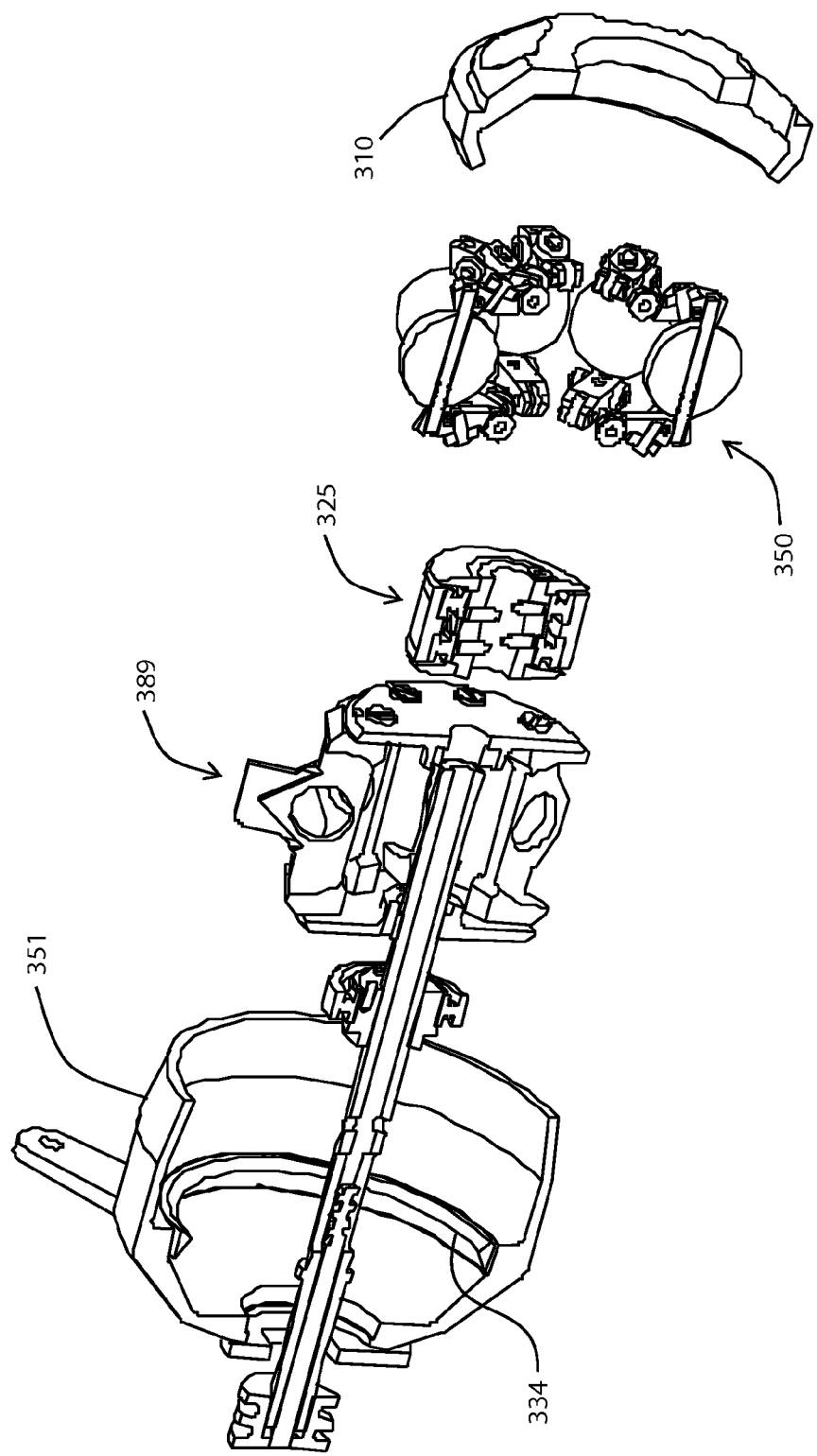
FIG. 4 is a partially exploded cross-sectional view of the PMD of FIG. 3.
Figure 5:
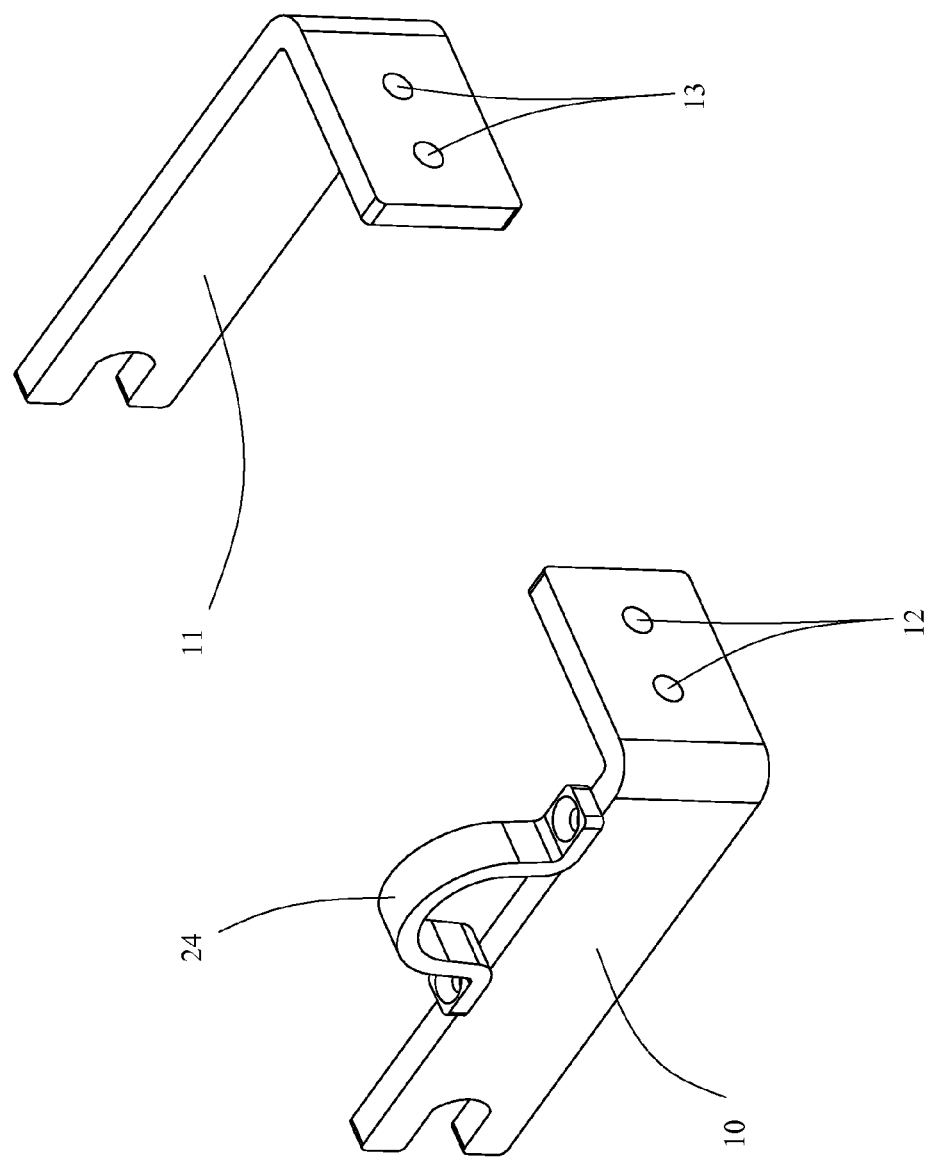
FIG. 5 is a perspective of a mounting bracket of the PMD of FIG. 1.
Figure 6:
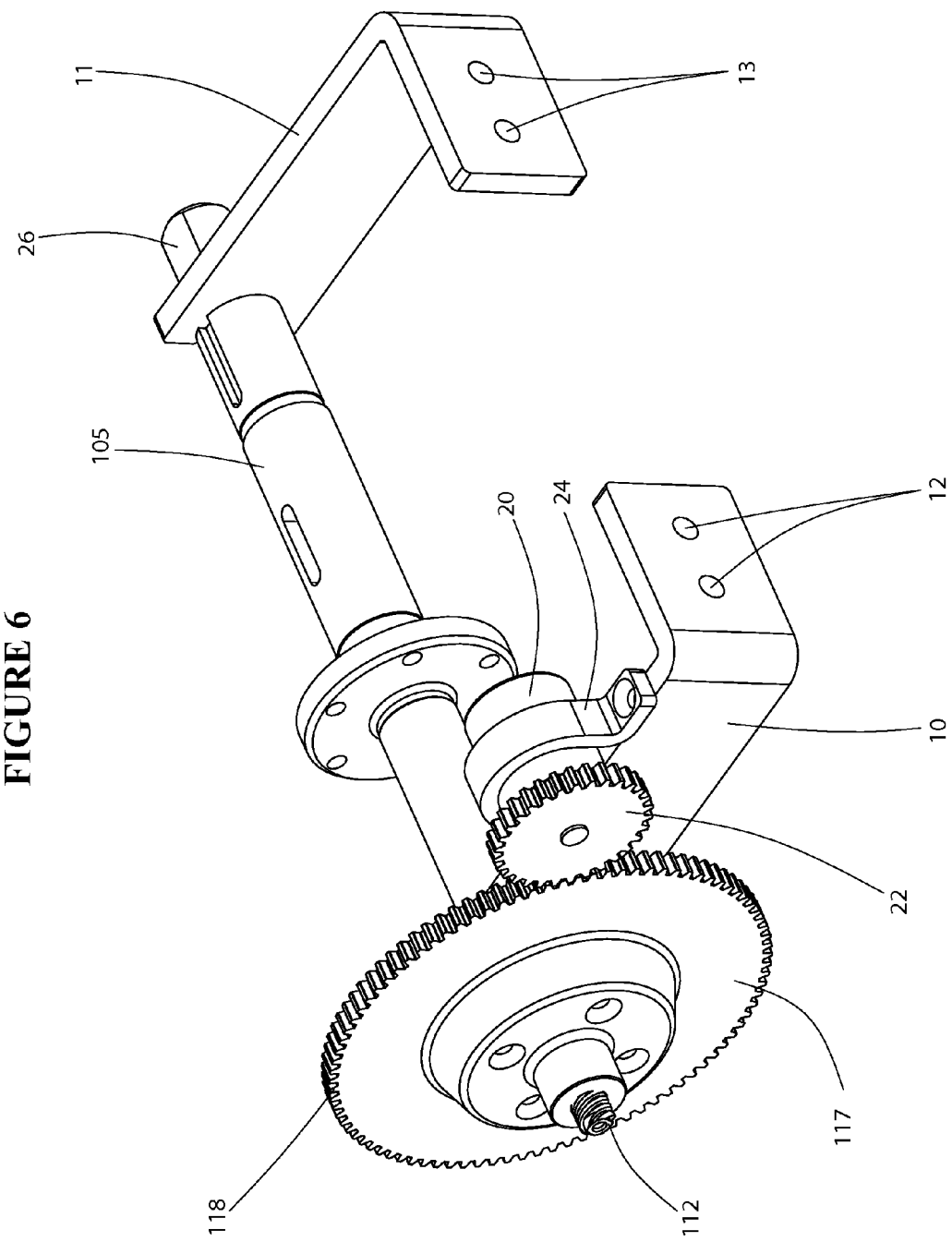
FIG. 6 is a perspective view of a control subassembly of the PMD of FIG. 1.
Figure 10:
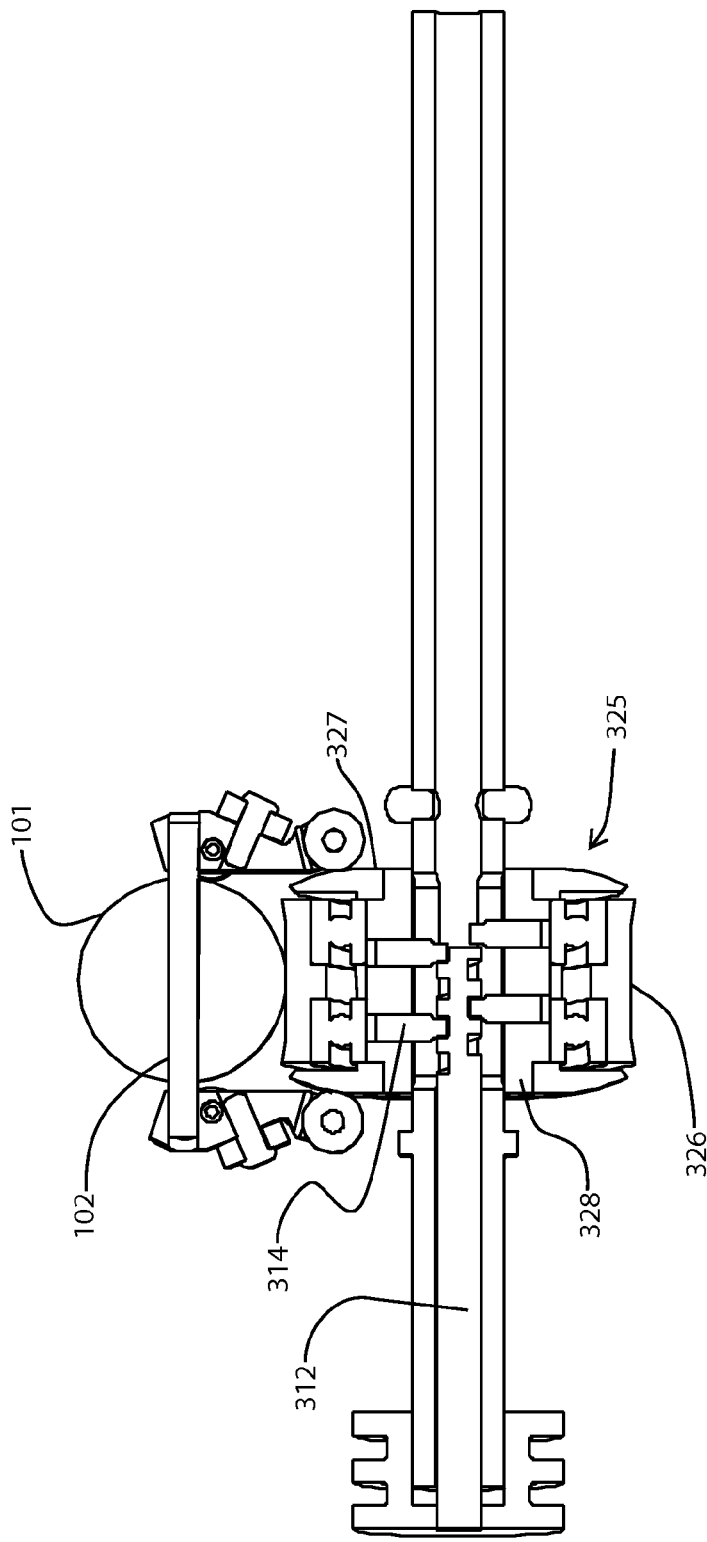
FIG. 10 is a cross-sectional view of a shifter assembly that can be used in a PMD.

Turning now to FIGS. 3, 4 and 10, a PMD 300, which is an alternative embodiment of the PMD 100, will now be described. The PMD 300 includes a case 351 that houses, among other components, a traction ring 334, a cage 389, a sun assembly 325, a planet-leg assembly 350, and a traction ring 310. Compared to the traction rings 110, 134, the angles of the traction rings 310, 334 are decreased, which increases the ability of the traction rings 310, 334 to withstand axial forces and reduces the overall radial diameter of the PMD 300. The PMD 300 exhibits an alternate shifting mechanism, where a shift rod 312 includes a lead screw mechanism adapted to actuate an axial movement of a sun assembly 325. In this embodiment, the lead screw mechanism includes a set of lead threads 313 formed on the end of the shift rod 312 that is within or near the sun assembly 325. One or more sun assembly pins 314 extend radially from the cam disc extensions 328 into the lead threads 313 and move axially as the shift rod 312 rotates.

In the illustrated embodiment, the sun 326 does not have a constant outer diameter, but rather has an outer diameter that increases at the ends of the sun 326. This design causes lubrication within the PMD 300 that contacts the sun 326 to centrifugally be pulled to the largest diameter of the sun 326. Once the lubrication reaches the ends of the sun 326, the lubrication is sprayed radially away from the center of the PMD 300 to those components requiring lubrication. In some embodiments, this design allows the sun 326 to resist forces that tend to drive the sun 326 axially away from a center position. However, this is merely an example and the outer diameter of the sun 326 can be varied in any manner a designer desires to react the forces applied to the sun 326 and to aid in shifting of the PMD 300.

Referring now to FIGS. 2A, 2B, 5, and 6, in some embodiments the mounting brackets 10, 11, are adapted to connect the PMD 100 to a stationary object, such as an automobile frame (not shown), engine block (see FIG. 21), or a bracket (not shown) attached to either the frame or the engine block. In one embodiment, the brackets 10, 11 mount over flats 26 formed near each end of the central shaft 105. The end nuts 106, 107 thread over each end of the central shaft 105 to clamp the mounting brackets 10, 11 to the PMD 100. In some embodiments the mounting brackets 10, 11 are made from steel, although in other embodiments other materials may be used, such as titanium, aluminum, or composites. Either or both of the mounting brackets 10, 11 can be adapted to be removable. The mounting bracket 10 can include holes 12 which enable standard fasteners to be used to attach the mounting bracket 10 to a stationary object such as an engine block or frame. In one embodiment, mounting bracket 11 is removable and has holes 13 which allow it to be attached to, a stationary object such as an engine block or frame. The mounting brackets 10, 11 in some embodiments are attached to each other using standard fasteners. In other embodiments, the removable bracket 11 is not used and the mounting bracket 10 is a u-shaped component with holes 12 formed into it so that standard fasteners can be used to mount the PMD 100 to a stationary object. In some embodiments, the mounting bracket 11 can be quickly removed with standard fasteners to facilitate the replacement of either the input belt (not shown) or the output belt (not shown). In other embodiments, the mounting bracket 10 and/or the mounting bracket 11 can be other shape to accommodate the object to which it is attached. In certain embodiments, one or both of the mounting brackets 10, 11 can be operably connected to the cage assembly 180 and serve to anchor the cage assembly 180 and prevent it from rotating.

In some embodiments a motor 20, such as a stepper motor, can be used to shift and adjust the speed ratio of the PMD 100. The motor 20 mounts to the mounting bracket 10 with a motor bracket 24 and standard fasteners, and in some embodiments the motor bracket 24 is made of the same material as the mounting brackets 10, 11. A driving gear 22 couples to the shaft on the motor 20. The driving gear 22 meshes with the shift gear 118, which in some embodiments is larger than the driving gear 22 to increase torque and reduce speed at the shift rod 112. A shift bushing 119 mounts concentrically over the central shaft 105 with a slip fit, which allows the shift bushing 119 to rotate freely. The end nut 107 prevents the shift bushing 119 from moving axially toward the center of the PMD 100. The shift gear 118 threads over the shift rod 112 and attaches to the shift bushing 119 with standard fasteners.

In operation, the motor 20 drives the driving gear 22, which drives the shift gear 118, which rotates the shift rod 112, and thereby causes a change in the speed ratio of the PMD 100. In some embodiments, the motor 20 is controlled by a logic device (not show) with a control feedback loop which counts the automobile engine rpm, and/or the PMD 100 rpm, and which can then send a signal to the stepper motor 20 to shift the PMD 100. Said logic devices are well known in the relevant technology.

Figure 7:
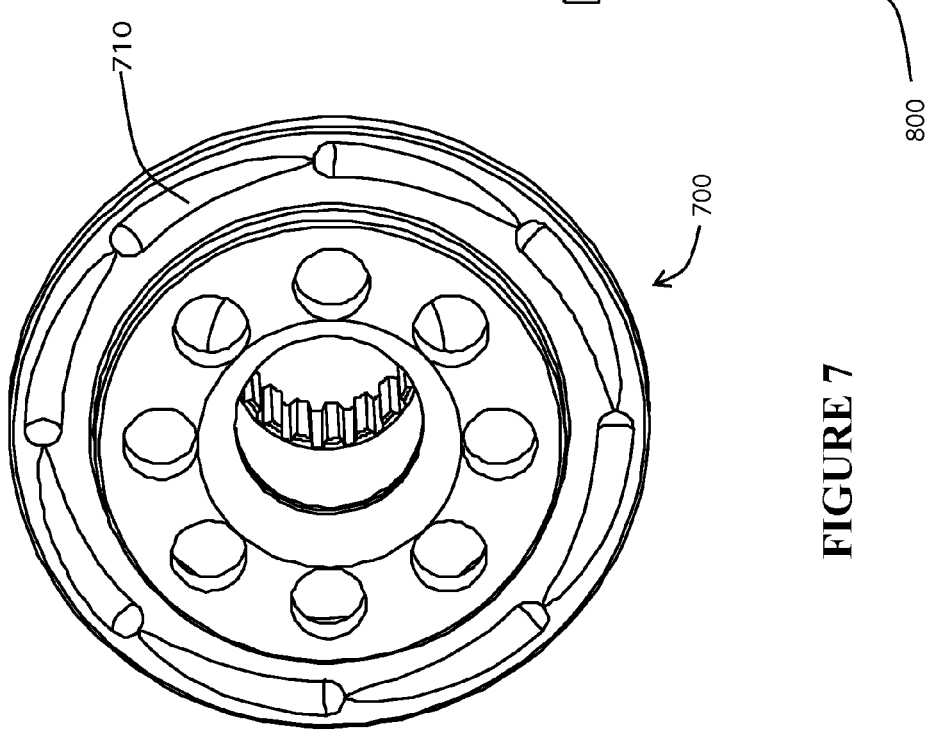
FIG. 7 is a cam roller disc that can be used with a PMD.

FIG. 7 illustrates a cam ring 700 that can be used in, for example, the PMD 100, PMD 300, or other ball planetary PMDs. The cam ring 700 has cam channels 710 formed in its radial outer edge. The cam channels 710 house a set of cam rollers (not shown) which can be spheres (such as bearing balls) but can be any other shape that combines with the shape of the cam channel 710 to convert torque into torque and axial force components to moderate the axial force applied to the variator assemblies 140, 340 in an amount substantially proportional to the torque applied to the PMD 100, 300. Other such shapes include cylindrical rollers, barreled rollers, asymmetrical rollers or any other shape. The material used for the cam disc channels 710 in many embodiments is preferably strong enough to resist excessive or permanent deformation at the loads that the cam disc 700 will experience. Special hardening may be needed in high torque applications. In some embodiments, the cam disc channels 710 are made of carbon steel hardened to 40 HRC or higher. The efficiency of the operation of the cam loader (such as cam loader 154 of FIG. 1, or any other type of cam loader) can be affected by the hardness value, typically by increasing the hardness to increase the efficiency; however, high hardening can lead to brittleness in the cam loading components and can incur higher cost as well.

FIG. 7 shows an embodiment of a conformal cam. That is, the shape of the cam channel 710 substantially conforms to the shape of the cam rollers. Since the channel 710 conforms to the roller, the channel 710 functions as a bearing roller retainer, obviating in some circumstances the use of a cage element for housing and/or spacing the cam rollers. The embodiment of FIG. 7 is a single direction load cam ring 700; however, the load cam ring 700 can be a bidirectional load cam ring (see FIGS. 23-25 for an example of a bidirectional load cam ring). In some embodiments, obviating the use of a bearing roller retainer simplifies the design of the PMD 100, 300. A conformal cam channel 710 also allows the contact stress between the bearing roller and the channel 710 to be reduced, allowing for reduced bearing roller size and/or count, or for greater material choice flexibility.

Figure 8:
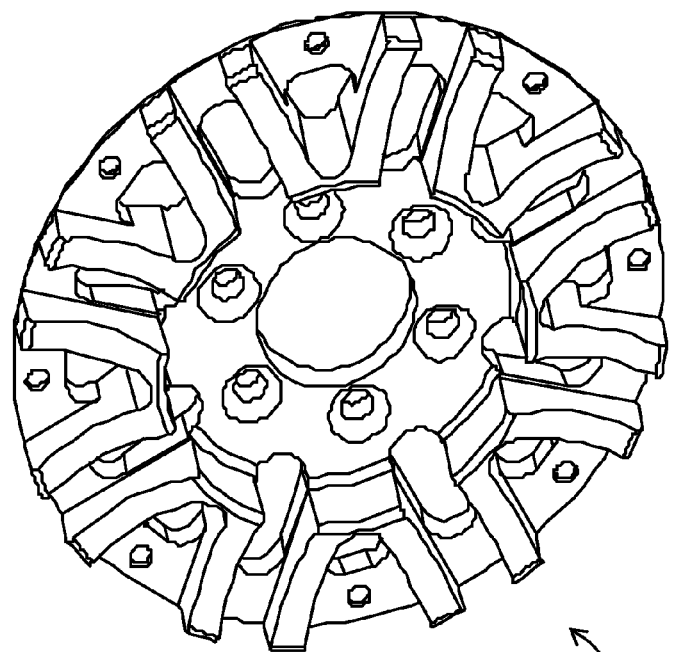
FIG. 8 is a stator plate that can be used with a PMD.

FIG. 8 illustrates a cage disc or stator plate 800 used to form the support structure of the cage 189 of the cage assembly 180 of the variator assembly 140 or of the cage assembly 389 of the variator assembly 340. In some embodiments, the cage disc 800 is shaped to guide and support the legs 103 as the legs 103 move radially inward and outward during shifting. The cage disc 800 also provides the angular alignment of the axles 102. In some embodiments, the corresponding grooves of two cage discs 800 for a respective axle 102 are offset slightly in the angular direction to reduce shift forces in the variator assemblies 140, 340.

In certain embodiments, the legs 103 are guided by slots in a stator plate 800. The leg rollers 1107 (see FIG. 11) on the legs 103 follow a circular profile in the stators. The leg rollers 1107 generally provide a translational reaction point to counteract translational forces imposed by shift forces or traction contact spin forces. The legs 103, as well as its respective leg rollers 1107, move in a planar motion when the PMD 100, 300 ratio changes, and thus, the legs 103 trace out a circular envelope centered about the center of the planet 101. Since the leg rollers 1107 are offset from the center of the leg 103, the leg rollers 1107 trace out an envelope that is similarly offset. To create a compatible profile on each stator plate 800 to match the planar motion of the leg rollers 1107, a circular cut is required that is offset from the groove center by the same amount that the roller is offset in each leg 103.

Figure 9:
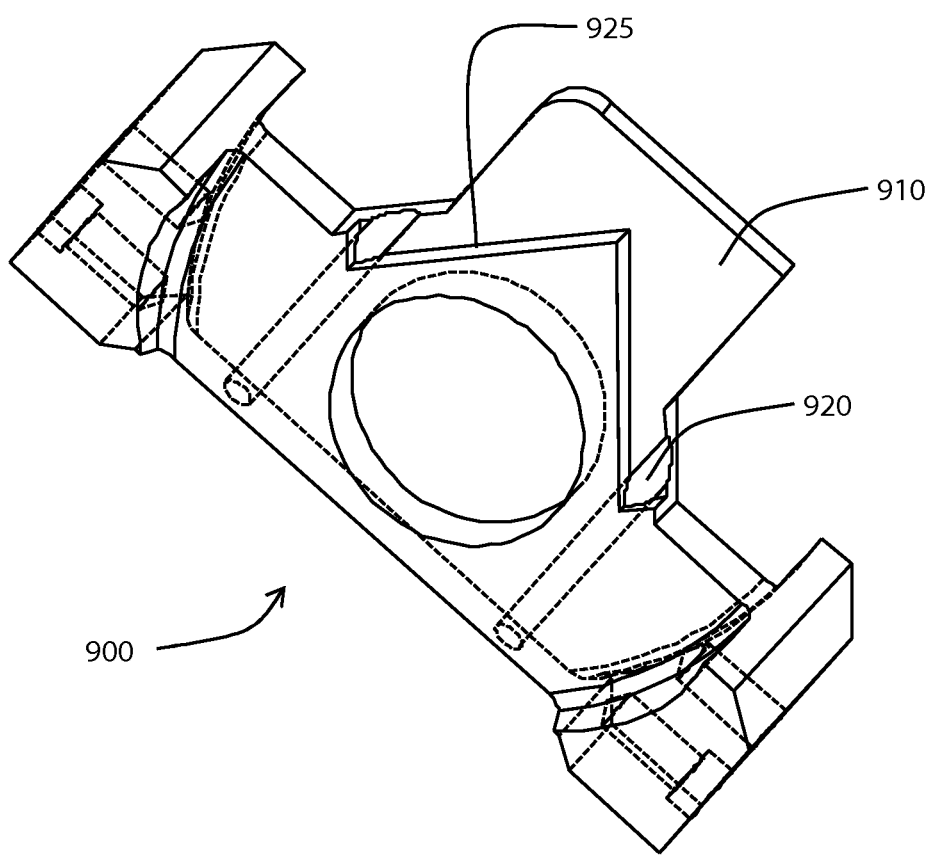
FIG. 9 is a perspective view of a scraping spacer that can be used with a PMD.

Referring now to FIGS. 2A, 9 and 12, an alternative embodiment of a cage assembly 389 is illustrated implementing a lubrication enhancing lubricating spacer 900. In the illustrated embodiment, the support structure for the planets 101, in this case the cage 389 (see also FIG. 4), is formed by attaching cage discs 1220 to a plurality of spacers 1210, including one or more lubricating spacers 900. The lubricating spacer 900 has a scraper 910 for scraping lubricant from the surface of the case 138, 351 and directing that lubricant back toward the center elements of the variator assemblies 140, 340. The lubricating spacer 900 of some embodiments also has passages 920 to help direct the flow of lubricant to the areas that most utilize it. In some embodiments, a portion of the spacer 900 between the passages 920 forms a raised wedge 925 that directs the flow of lubricant towards the passages 920. The scraper 910 may be integral with the spacer 900 or may be separate and made of a material different from the material of the scraper 910, including but not limited to rubber to enhance scraping of lubricant from the case 138. The ends of the spacers 1210 and the lubricating spacers 900 terminate in flange-like bases 1240 that extend perpendicularly to form a surface for mating with the cage discs 1220. The bases 1240 of the illustrated embodiment are generally flat on the side facing the cage discs 1240 but are rounded on the side facing the planets 101 so as to form the curved surface described above that the leg rollers 151 ride on. The bases 1240 also form the channel in which the legs 103 ride throughout their travel.

An embodiment of a lubrication system and method will now be described with reference to FIGS. 3, 9, and 10. As the planets 101 spin, lubricant tends to flow toward the equators of the planets 101 and then to spray out against the case 351. Some lubricant does not fall on the internal wall of the case 351 having the largest diameter; however, centrifugal force makes this lubricant flow toward the largest inside diameter of the case 351. The scraper 910 is positioned vertically so that it removes lubricant that accumulates on the inside of the case 351. Gravity pulls the lubricant down each side of V-shaped wedge 925 and into the passages 920. The spacer 900 is placed such that the inner radial end of the passages 920 end in the vicinity of the cam discs 327 and the sun 126. In this manner the sun 126 and the cam discs 327 receive lubrication circulating in the case 351. In one embodiment, the scraper 910 is sized to clear the case 351 by about 30 thousandths of an inch. Of course, depending on different applications, the clearance could be greater or smaller.

As shown in FIGS. 3 and 10, a cam disc 327 can be configured so that its side facing the sun 326 is angled in order to receive lubricant falling from the passages 920 and direct the lubricant toward the space between the cam 327 and the sun 326. After lubricant flows onto the sun 326, the lubricant flows toward the largest diameter of the sun 326, where some of the lubricant is sprayed at the axles 102. Some of the lubricant falls from the passages 920 onto the sun 326. This lubricant lubricates the sun 326 as well as the contact patch between the planets 101 and the sun 326. Due to the inclines on each side of the sun 326, some of the lubricant flows centrifugally out toward the edges of the sun 326, where the lubricant then sprays out radially.

Referring to FIG. 3, in some embodiments, lubricant sprayed from the sun 126, 326 towards the axle 102 falls on grooves 345, which receive the lubricant and pump it inside the planet 101. Some of the lubricant also falls on the contact surface 111 where the traction rings 110, 134 contact the planets 101. As the lubricant exits on one side of the planet 101, the lubricant flows toward the equator of the planets 101 under centrifugal force. Some of this lubricant contacts the first traction ring 110 and planet 101, contacts surface 111, and then flows toward the equator of the planet 101. Some of the lubricant flows out radially along a side of the second traction ring 134 facing away from the planets 101.

Referring to FIGS. 13, 14, 21, 22, in one embodiment a PMD 1300 connects directly to a crankshaft of an automobile engine 790. For simplicity, only the differences between the PMD 100 and PMD 1300 will be described. A central shaft 1305, similar to the central shaft 105, has been modified so that shifting actuation is now from the side of the axle cap 143, rather than the side of the end cap 160. The motor 20, driving gear 22, motor bracket 24, mounting bracket 10, and lead screw assembly 115 now appear in the vicinity of the axle cap 143.

Figure 13:
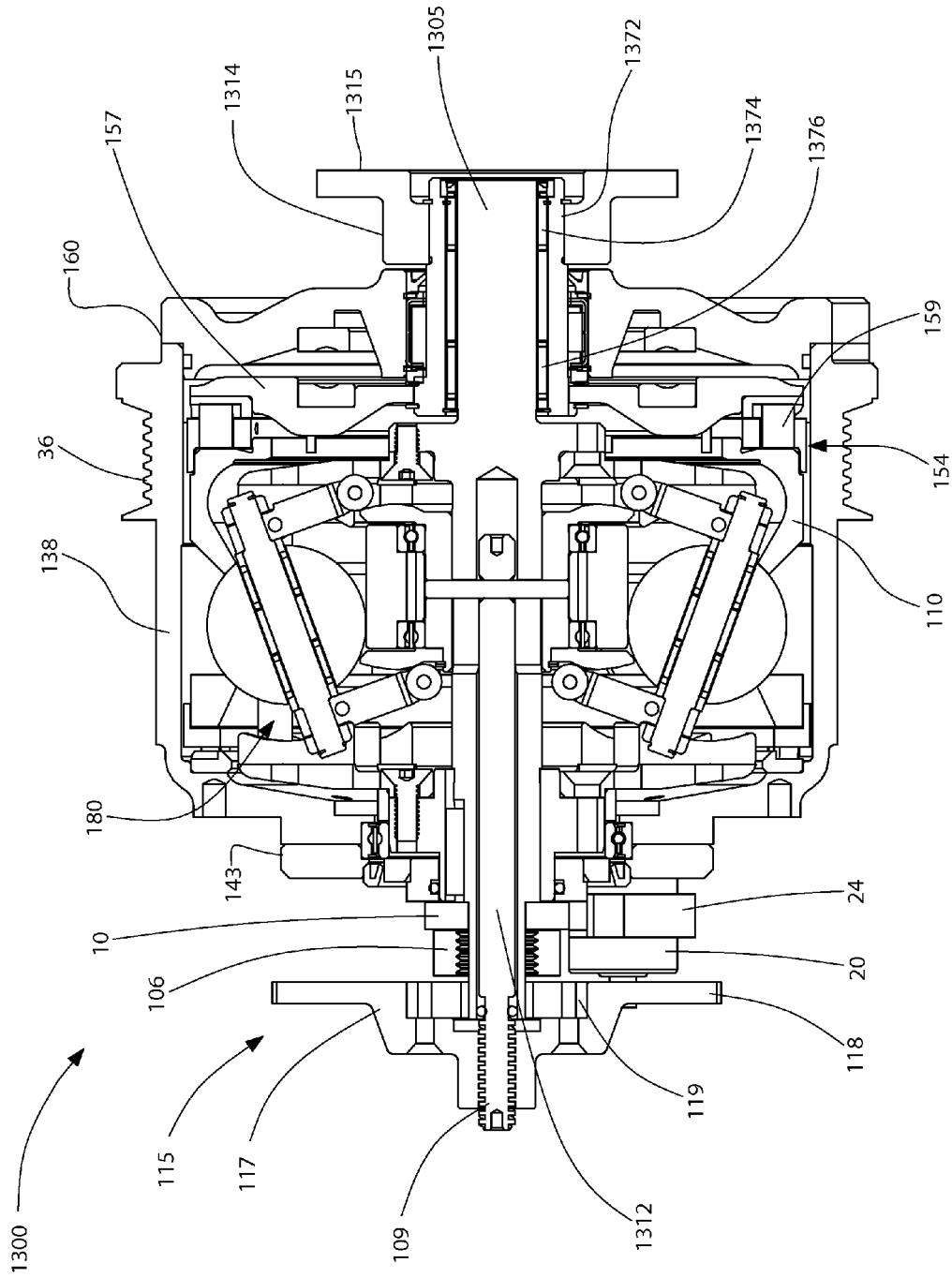
FIG. 13 is a cross-sectional view of another embodiment of a PMD.

A crankshaft mount 1314, which in some embodiments is a generally disc shaped component with a flange 1315, is adapted to attach to a corresponding part (not shown) on the engine crankshaft (also not shown). The flange 1315 in some embodiments includes holes, through which standard fasteners are screwed into threaded holes on a corresponding part attached to the engine crankshaft. In some embodiments, the crankshaft mount 1314 is configured as a cylindrical coupler which is keyed to the engine crankshaft. In the embodiment of FIG. 13, the crankshaft mount 1314 couples to a driver 1372 with a key, spline, fasteners, interference fit, or any other suitable method. The driver 1372 in some embodiments is a cylinder made from hardened steel. In some embodiments two needle roller bearings 1374, 1376, are positioned inside the bore of the driver 1372 and over the central shaft 1305 to absorb the significant torque transferring loads which develop during operation of the PMD 1300.

The driver 1372 transfers torque to the first load cam ring 157 and attaches to the first load cam ring 157 with a key, spline, fasteners, interference fit, or any other suitable method.

Figure 14:
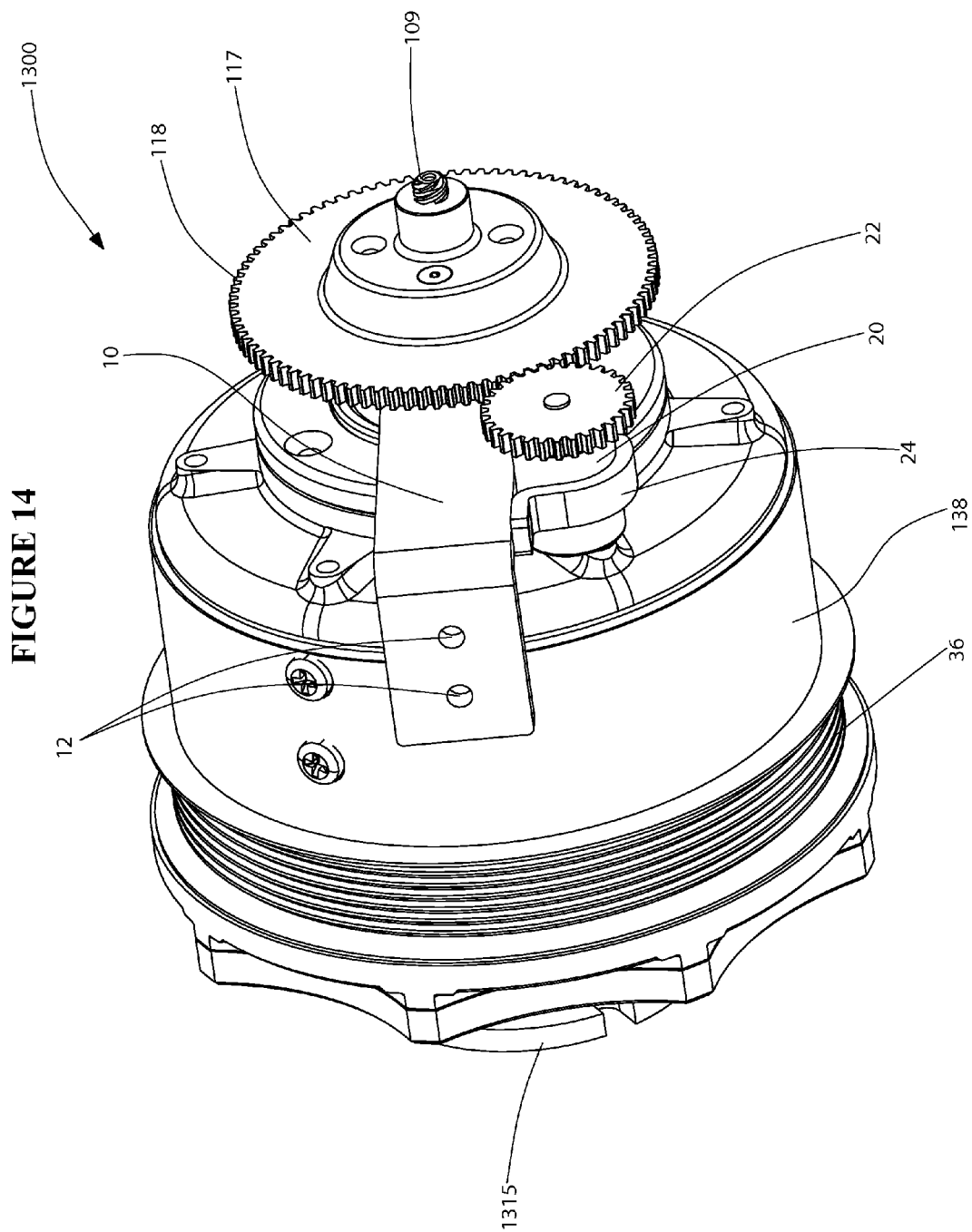
FIG. 14 is a perspective view of the PMD of FIG. 13.

Referring to FIGS. 13 and 14, the PMD 1300 generally shifts in the same manner and with the similar components as the PMD 100, but the lead screw assembly 115 comprising the shift actuator 117, shift gear 118, shift bushing 119, and pulley snap ring 116 are now in the vicinity of the axle 143. The motor 20, driving gear 22, motor bracket 24, and mounting bracket 10 are also now in the vicinity of the axle 143. In this embodiment both the mounting bracket 10 and the crankshaft mount 1314 cooperate to support the PMD 1300.

Figure 21:
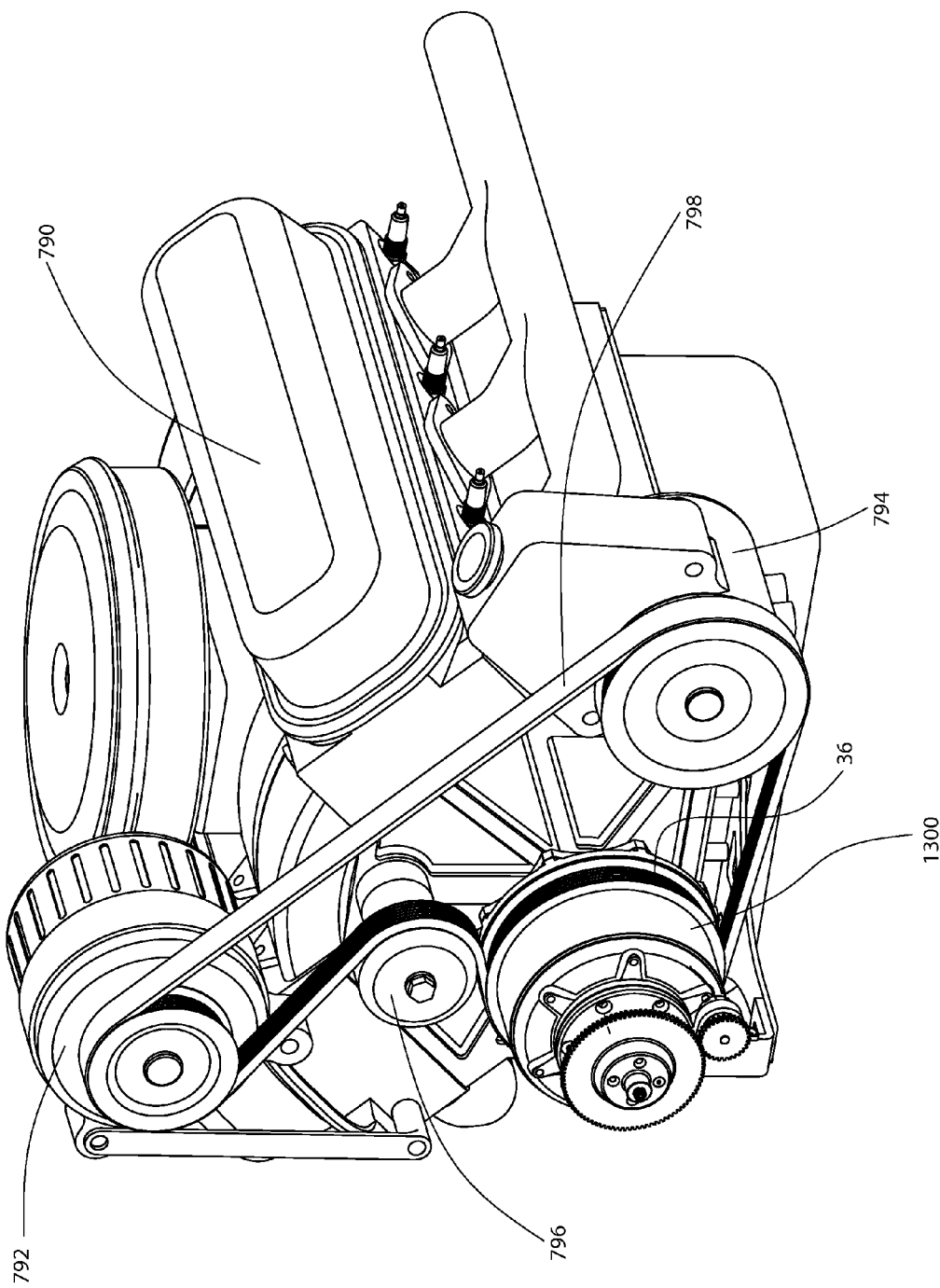
FIG. 21 is a perspective view of the PMD of FIG. 13 coupled to the crankshaft of an automobile engine.
Figure 22:
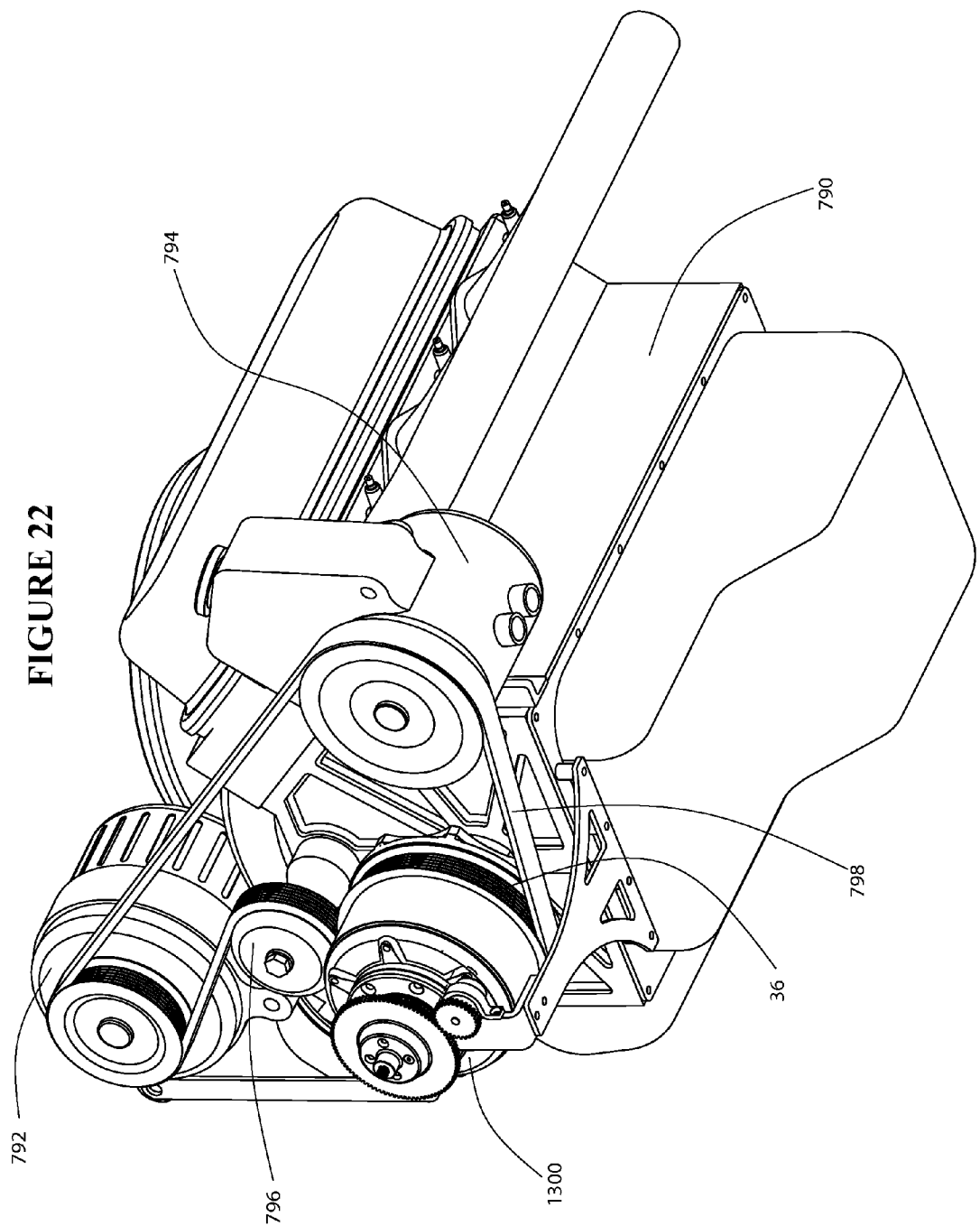
FIG. 22 is another perspective view of the PMD of FIG. 21.

Referring to FIGS. 21 and 22, the PMD 1300 is shown coupled to the crankshaft of an automobile engine 790 and operably coupled to an alternator 792, a power steering pump 794, and an idler pulley 796. An endless serpentine belt 798, operably coupling to and driven by the pulley 36, powers the alternator 792 and the power steering pump 794. Other automobile accessories (not shown) can also be driven by the serpentine belt 798, such as water pumps, fuel pumps, oil pumps, air conditioning compressors, cooling fans, superchargers, and any other device that can be powered by an automobile engine 790. In certain embodiments, the PMD 1300 couples to the crankshaft via a speed/torque reduction mechanism. For example, a belt or a chain can couple, respectively, a belt driven pulley or a chain driven sprocket connected to the crankshaft to the PMD 1300. In yet other embodiments, the PMD 1300 can be adapted to incorporate or cooperate with a harmonic balancer, which is a device typically coupled to a vehicle engine crankshaft to react vibrational forces that arise during operation of the engine.

As will be described further below, yet another aspect of certain embodiments of the power modulators shown here relates to compound devices that integrate an alternator and/or starter motor with a power modulating device (PMD). In some embodiments, the PMD is configured as a planetary power modulator such that both the armature and the stator (or field component) of the alternator/motor rotate. Because the rotor and the stator rotate in opposite directions a large speed differential is created, thereby producing an alternator and/or starter motor with very high power density. As used here, an "armature" is one of the two principal components of an electro-mechanical machine, such as a motor or a generator. For descriptive purposes, here the term "field" will refer to the second principal component, such as a field winding or field magnets, of the electromechanical machine. Generally, the field creates a magnetic field for the armature to interact with, so the field typically includes permanent magnets, or electromagnets formed by a conducting coil. The armature is generally a conductor or a conductive coil, oriented normal to both the field and to the direction of motion, torque (rotating machine), or force (linear machine). The armature, in contrast to the field, usually is adapted to carry current or electromotive force (or usually both). The armature can be adapted to carry current crossing the field, thus creating shaft torque (in a rotating machine) or force (in a linear machine). The armature can additionally be adapted to generate an electromotive force. In the armature, an electromotive force is created by the relative motion of the armature and the field. When the machine functions as a motor, this electromotive force opposes the armature current, and the armature converts electrical power to mechanical torque and transfers the torque to a load via a shaft. When the machine functions as a generator, the armature electromotive force drives the armature current, and thereby, shaft mechanical power is converted to electrical power.

Figure 15A:
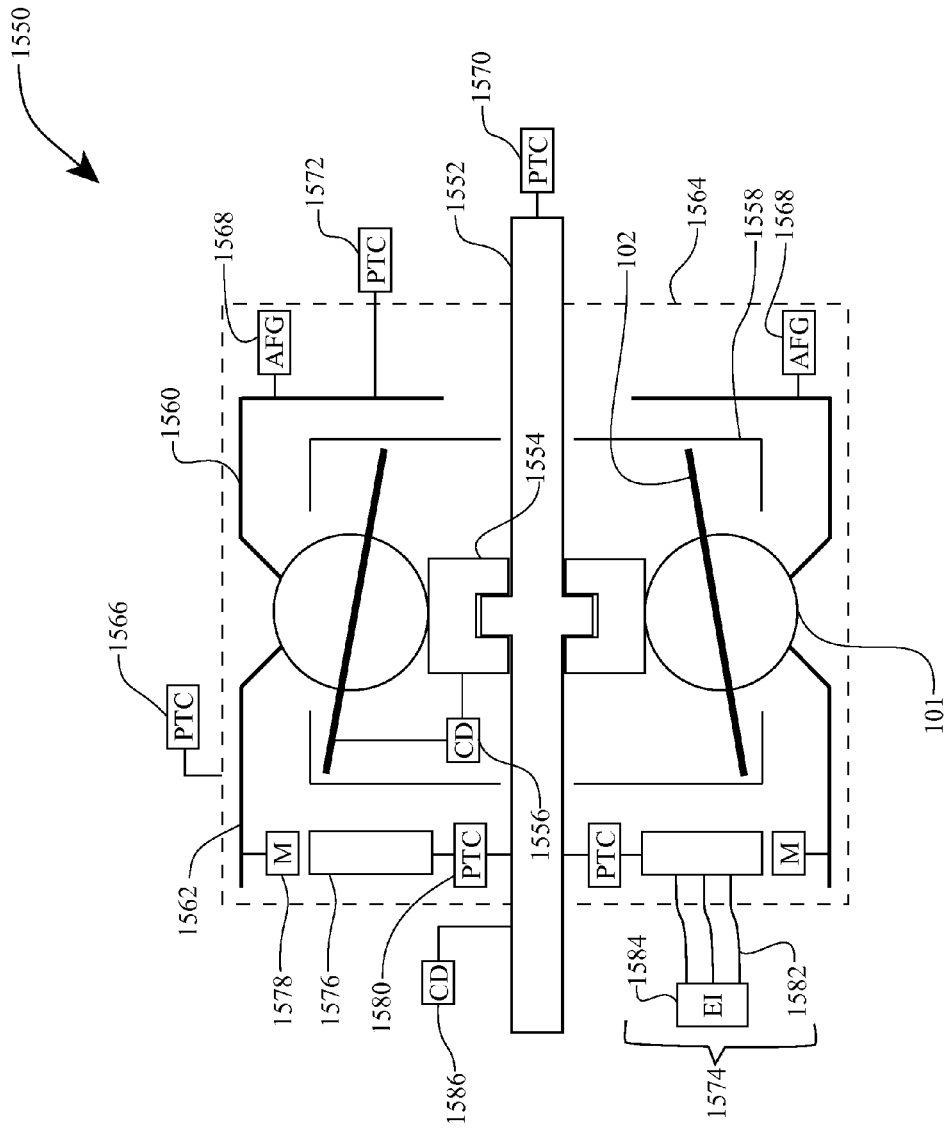
FIG. 15A is a schematic diagram of a compound device including a PMD, a motor, and generator.

As shown in FIG. 15A, in one embodiment, a compound device 1550 can include a sun shaft 1552 coupled to a sun 1554. In one embodiment, a control device 1556 couples to the sun 1554 and to a planet axle 102. A group of planets 101 is configured to engage the sun 1554 to transfer torque either frictionally or through an elastohydrodynamic interface, or both. A cage 1558, which could be the cage 389 and/or include appropriately shaped stator plates similar to stator plates 800, 1220, can be used to support and/or guide the planet axles 102 and/or components of the control device 1556. In some embodiments, traction rings 1560, 1562 are placed in contact with the planets 101 to transfer torque either frictionally or through an elastohydrodynamic interface, or both.

In one embodiment a control device 1586 couples to the sun shaft 1552 and is adapted to produce an axial movement of the sun shaft 1552. In certain embodiments, the control device 1556 and the control device 1586 are operationally coupled such that an axial movement of the sun shaft 1552 is coordinated with an axial movement of the sun 1554 and a tilting of the planet axles 102. Although in FIG. 15A the sun shaft 1552 couples to the sun 1554 in such a manner that the sun shaft 1552 and the sun 1554 must move axially together, in other embodiments the axial movement of the sun shaft 1552 and the sun 1554 are decoupled. Hence, in some embodiments, the control device 1556 actuates a tilting of the planet axles 102 and/or an axial movement of the sun 1554, but the sun shaft 1552 remains axially fixed. The control devices 1556, 1586 can be any electronic, mechanical, or electromechanical device, magnetic or electromagnetic device, servomotor, or servomechanism that is adapted to effectuate a tilt of the planet axles 102 and/or an axial movement of the sun shaft 1552 and/or sun 1554, which axial movement can in some cases be simultaneous with the tilting of the planet axles 102. For example, in one embodiment, the control device 1586 can be a lead screw mechanism powered by an electric motor to axially move the sun shaft 1552. A mechanical coupling between the sun shaft 1552 and the planet axles 102 causes the planet axles 102 to tilt as the sun shaft 1552 is displaced axially.

In one embodiment, the compound device 1550 can include a housing or case 1564 that, among other things, contains and/or protects the internal components of the compound device 1550. In certain embodiments, the housing 1564 includes a generally cylindrical shell that fastens to end covers; in yet other embodiments, the housing 1564 consists of a cylindrically shaped can having a bottom with a central bore and a mouth opening that is covered with a cover plate also having a central bore. In one embodiment, the traction ring 1562 is integral with at least a portion of the housing 1564. In some embodiments, at least a portion of the housing 1564 couples to a power transfer coupling 1566; in yet other embodiments, the power transfer coupling 1566 couples directly with the traction ring 1562, or the power transfer coupling 1566 is integrally formed with the housing 1564 and the traction ring 1562.

In some embodiments, the compound device 1550 includes one or more axial force generators (AFGs) 1568 to provide a clamping force that facilitate the transfer of torque across the traction ring 1560, the planets 101, the sun 1554, and the traction ring 1562. The AFGs 1568 can be of the type, for example, described above with reference to FIG. 2A and FIG. 13 where one or more cam loaders 54, 154 function as axial force generators. In some embodiments, the sun shaft 1552 couples to a power transfer coupling 1570 adapted to transfer torque to or from the shaft 1570. A power transfer coupling 1572 can be operationally coupled to transfer torque to or from the traction ring 1560. In some embodiments, the power transfer coupling 1572 couples to the traction ring 1560 through the AFG 1568; in yet other embodiments, the power transfer coupling 1572 and the AFG 1568 are at least partly integrated with one another. The power transfer couplings 1566, 1570, 1572 can be any device, feature, or component adapted to transfer power (the power having torque and/or speed characteristics); for example, the power transfer couplings 1566, 1570, 1572 can be pulleys, sprockets, one-way clutches, freewheels, cogs, levers, cranks, splines, keys, interference fits, welds, magnetic fields, etc., which can be suitably configured to cooperate with corresponding pulleys, chains, belts, etc., to transfer power.

As shown in FIG. 15A, the compound device 1550 can include a motor/generator unit 1574 that operates in conjunction with other components of the compound device 1550. The motor/generator unit 1574 can include an electrical armature 1576 that mounts concentrically about the sun shaft 1552. The electrical armature 1576 is adapted to cooperate with a magnetic field generator 1578 to provide the functionality of either an electric generator or an electric motor. The magnetic field generator 1578 can be a group of permanent magnets or an electromagnetic subassembly. In some embodiments, the magnetic field generator 1578 is integral with the housing 1564 and/or the traction ring 1562. In other embodiments, the magnetic field generator 1578 couples via a flange, spline, gear, etc., to the traction ring 1562 and/or the housing 1564. In certain embodiments, the sun shaft 1552 couples to the electrical armature 1576 via a power transfer coupling 1580, which may be a grooved spline, straight spline, ball spline, general spline, key, etc.

In one embodiment, the electrical armature 1576 connects to electrical conductors 1582, which connect to an electrical interface 1584. The compound device 1550 of FIG. 15A shows three electrical conductors 1582, representing three leads of a three-phase motor/generator. However, in other embodiments, the motor/generator unit 1574 can include more or less phases. The electrical interface 1584 can be any device adapted to receive from or deliver electricity to the electrical conductors 1582. In some embodiments, the electrical interface 1584 includes a rotating electrical conductor and/or a battery.

During operation, in one configuration power can be input into the compound device 1550 via the PTC 1570. If a prime mover, for example the crankshaft of an automobile, drives the PTC 1570, and thereby drives the sun shaft 1552, in a clockwise direction, the sun 1554 is driven in a clockwise direction. With the cage 1558 fixed to ground, the planets 101 rotate in a counterclockwise direction and, consequently, drive the traction rings 1560, 1562 counterclockwise. The traction rings 1560, 1562 can then deliver the power to the PTCs 1572, 1566, respectively, in a counterclockwise rotation. The power from the PTCs 1572, 1566 can the be used to drive, for example, automobile accessories such as the water pump, cooling fan, air conditioning system compressor, etc. Simultaneously, the polarity of the motor/generator unit 1574 is set such that, as the sun shaft 1552 drives the electrical armature 1576 via the PTC 1580, the electrical armature 1576 and the magnetic field generator 1578 interact to produce electricity, which is received by the electrical conductors 1582 and delivered to the electrical interface 1584.

In another operational configuration, the compound device 1550 takes power at the PTC 1572, directly or through a belt, from a crankshaft in counterclockwise direction, for example. Mechanical power can then flow through the traction ring 1560, planets 101, traction ring 1562, and out through the case 1564 and/or the PTC 1566 in a counterclockwise direction. Mechanical power can also flow through the traction ring 1560, planets 101, sun 1554, sun shaft 1552, and out through the PTC 1570 in a clockwise direction. In some embodiments, the PTC 1570 can be placed at either end of the sun shaft 1552. Mechanical power can also be converted to electrical power as the traction ring 1562 drives the magnetic field generator 1578 in a counterclockwise direction simultaneously with the sun shaft 1552 driving the electrical armature 1576 in a clockwise direction.

In yet another operation configuration, the compound device 1550 can function as a motor, which can be used, among other things, to start a prime mover such as an automobile engine. Electrical power is delivered to the compound device 1550 via the electrical interface 1584. The source of that electrical power can be, for example, a battery. The electrical power delivered to the compound device 1550 excites the electrical armature 1576 which then interacts with the magnetic field generator 1578 to create a driving torque that drives the sun shaft 1552 via the PTC 1580 that couples the sun shaft 1552 and the electrical armature 1576. If the polarity of the motor/generator unit 1574 is selected to cause a clockwise rotation of the sun shaft 1552, the sun shaft 1552 drives the sun 1554 clockwise. This results in a counterclockwise driving of the planets 101, which then drive the traction rings 1560, 1562 in a counterclockwise direction. Power can then be taken out from the PTCs 1566, 1572. In one embodiment, the PTC 1566 is operationally coupled to a front end accessory drive system, which can include a number of pulleys, belts, sprockets, chains, gears, and/or one or more accessories. The PTC 1572 can be coupled directly or indirectly to a crankshaft in manner to facilitate the starting of the prime mover. Depending on the embodiment, the PTC 1570 can be located at either end of the sun shaft 1552 and may be used or left unused, or may not be present at all.

It should be noted that there are many operational configurations possible other than those described above. The operational configurations discussed above are only used as examples and their description is not meant to exclude the other possible operational configurations or limit in any way the variety of operation configurations that the compound device 1550 is capable of. For example, in some embodiments, the cage 1558 can be adapted to rotate about the sun shaft 1552. When the cage 1558 is so arranged, the compound device 1550 can have infinitely variable torque/speed regulation.

For any of the operational configurations described above, the control devices 1556, 1586 can be configured to regulate the torque/speed ratio between power inputs and power outputs via a tilting of the planet axles 102. For example, if there is a power input from a crankshaft into the PTC 1572, which power input varies over time in torque/speed, the compound device 1550 can be controlled such that the power output at the PTC 1566 is at a constant speed, which can be, for example, driving a group of accessories.

Referring now to FIGS. 15B-20, a PMD 600 is illustrated that incorporates a motor/generator 601. The PMD 600 incorporated with a motor/generator 601 is one embodiment of a compound device as described above with reference to FIG. 15A; for convenience, the compound device described next and the PMD 600 will be referred to interchangeably.

In certain configurations the PMD 600 can provide both, at alternative times, the functionality of the starter motor for an engine and the functionality of an alternator (or electrical generator) for a vehicle. The motor/generator 601 will also be referred to here as the M/G 601. For simplicity, only the differences between the PMD 100 and the PMD 600 will be described. In one embodiment, the M/G 601 is a 4-pole motor with 3 armature phases. The M/G 601 can have an armature 682 and a field 694 which rotate in opposite directions. The armature 682 is operably attached to a sun 718. Due to the planetary configuration of the planets 101, the sun 718 rotates in a direction opposite to the direction of rotation of the traction ring 750. The field 694, which in some embodiments is a rotating magnetic steel cylinder that rigidly attaches to the traction ring 134, can be integral with the traction ring 134, or can be made separately and coupled to the traction ring 134. In some embodiments the field 694 utilizes permanent magnets 680 annularly positioned around and attached to the inside diameter of the field 694. In other embodiments, the field 694 uses one or more electromagnets to produce the magnetic field. In some embodiments, the armature 682 includes coils 684 wrapped around multiple laminations 686 that attach to an armature mount 630. In one embodiment, the armature 682 has twenty-four silicon steel laminations, each having eighteen teeth. The armature mount 630 also positions the armature 682 relative to the field 694 and magnets 680, and routes the multiple wires (not shown) that connect the armature 682 to an electrical source, such as an automobile battery (not shown). The armature mount 630 operably attaches to a sun shaft 602 via a plurality of spline bearings 636. The sun shaft 602, a long, cylindrically shaped shaft positioned at the center of the PMD 600, is coincident with a longitudinal axis 11 and is capable of axial movement to actuate the sun 718 and thus shift the PMD 600. The sun shaft is further described below with reference to FIGS. 26A-26C.

A cable 676 houses the wires of the M/G 601, which wires are routed from the armature 682, through the armature mount 630, and terminate at a receptacle 674 inside the sun shaft 602. In one embodiment, the cylindrically shaped receptacle 674 accepts three leads from the three phases of the armature 682 and routes the three leads to a rotating conductor 672. The rotating conductor 672, a cylindrically shaped component, transfers electricity from a rotating end at the receptacle 674 to a stationary end at the conductor cap 668. In one embodiment, the rotating conductor 672 is of the type that uses liquid metal, such as mercury, to transfer current from the rotating end at the receptacle 674 to the stationary end at the conductor cap 668. In another embodiment, slip rings are used, although any other suitable method can be employed. Extending from the conductor cap 668, three leads 670 connect to a motor controller (not shown) and/or electrical source. In certain embodiments, the motor controller connects to the electrical source.

Figure 15B:
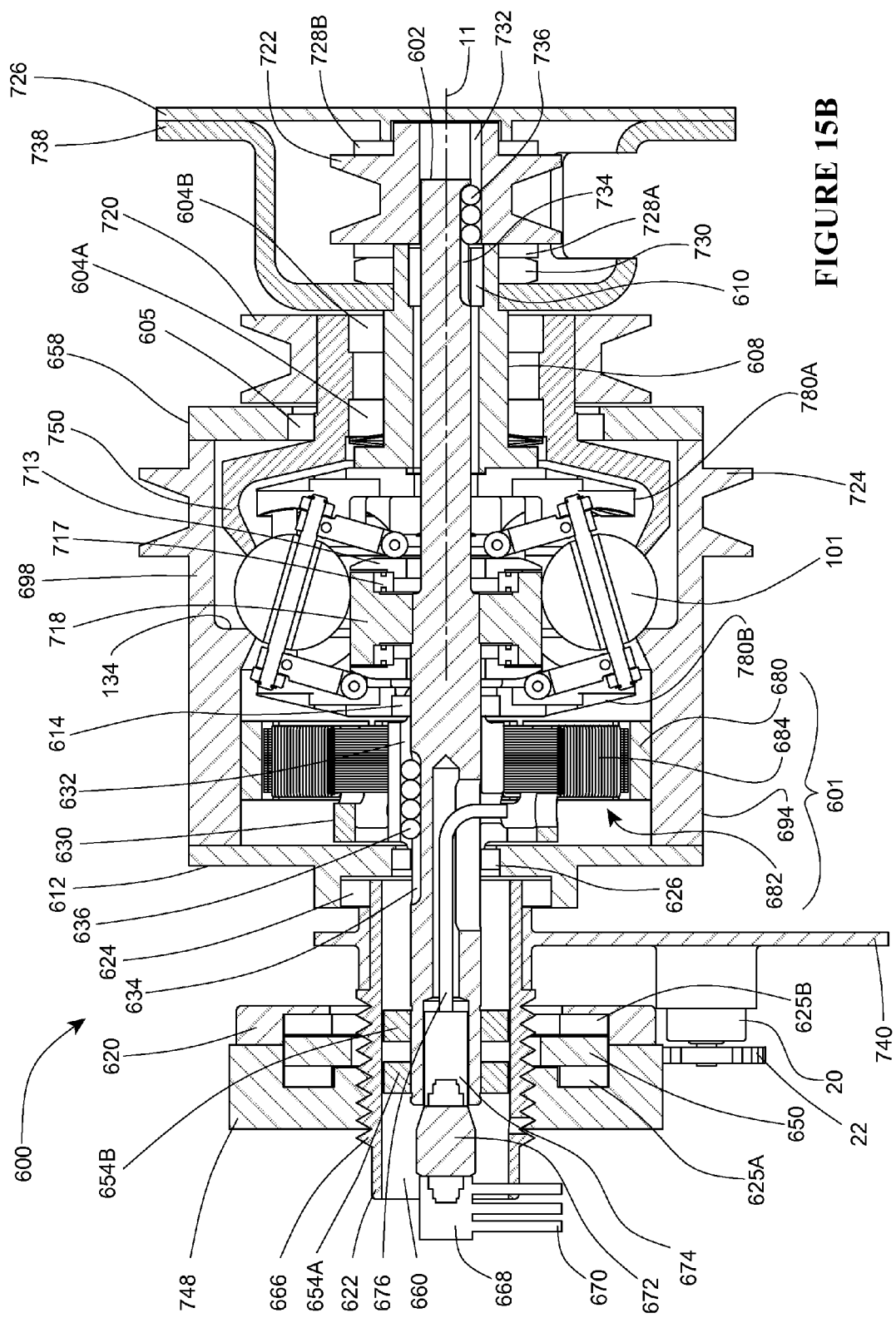
FIG. 15B is a cross-sectional view of one embodiment of the compound device of FIG. 15A.
Figure 20:
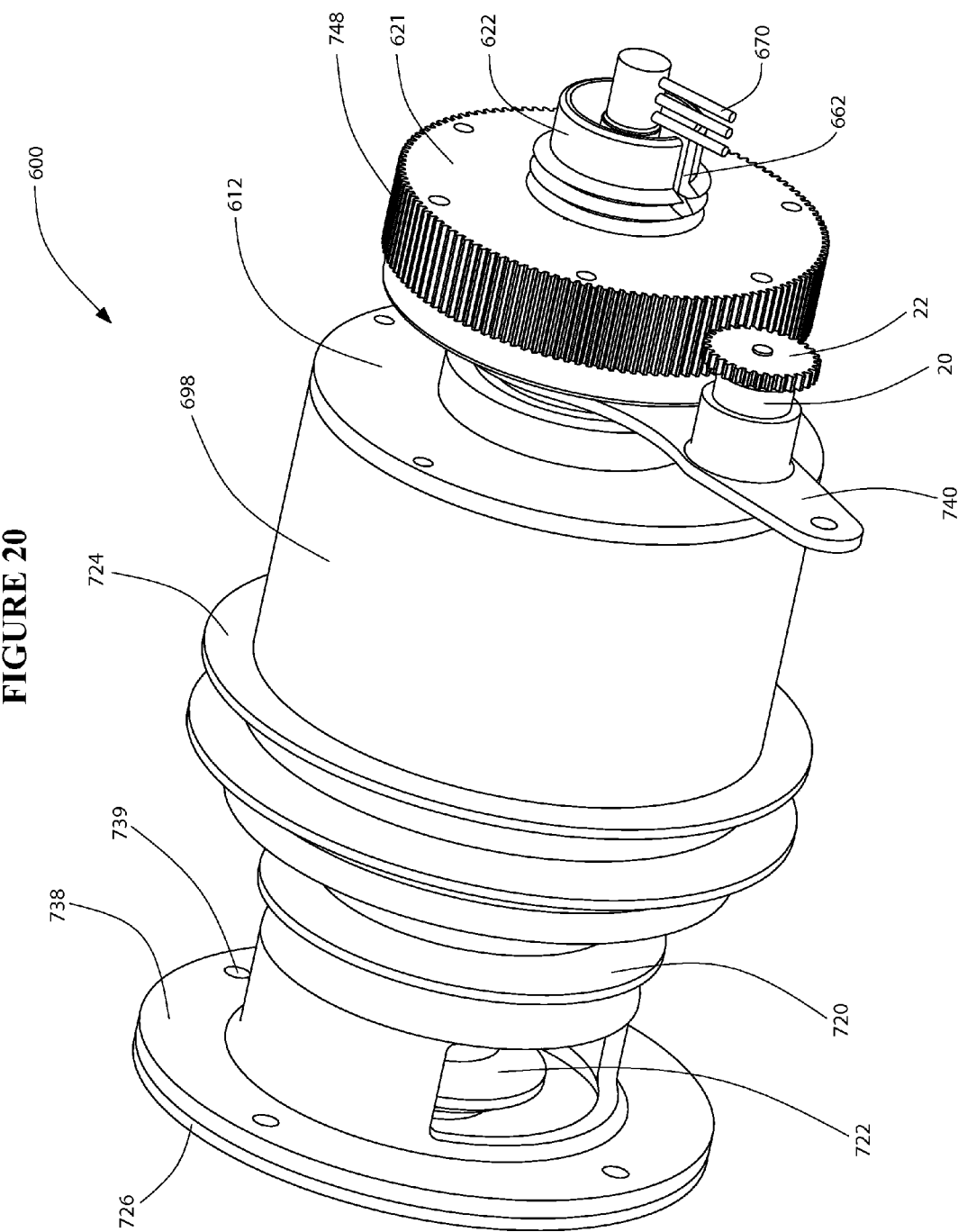
FIG. 20 is a perspective view of the compound device of FIG. 15B.

Referring now to FIGS. 15B and 20 in particular, in one embodiment the sun 718 is positioned closer to the traction ring 750 than to the traction ring 134 if the M/G 601 is operating as a motor. In many automobile applications, it is preferable that there be a reduction in rpm from the M/G 601 to the engine crankshaft to achieve the adequate torque multiplication to rotate the engine. As the sun 718 moves toward the traction ring 134, the speed of the traction ring 134 decreases while the speed of the traction ring 750 increases relative to the speed of the sun 718. If the M/G 601 operates at a constant speed, the speed of the field 694 decreases as the sun 718 moves toward the traction ring 134 because the field 694 is coupled to the traction ring 134 and rotates at a constant speed relative to the armature 682 and the sun 718. The net effect is that there is a significant speed reduction at the traction ring 750 in all ratios relative to the speed of the M/G 601.

Combining the PMD 600 with the M/G 601 allows a shared shaft, case, and bearings. Because in some applications of the PMD 600 the traction ring 134 and the field 694 are made as one, integral part from magnetic steel, the additional weight and cost of the magnetic steel which surrounds the magnets 680 is eliminated or substantially reduced.

Yet in other embodiments, there is the potential to liquid cool the armature 682 using the same fluid that is in the PMD 600. Depositing the same liquid on the armature 682 allows transmitting significantly more power through the M/G 601. In some embodiments, a liquid cooled motor can utilize the same fluid, pump, hoses, and seals used in the PMD 600. In certain embodiments, reduced size and weight are realized as three separate devices (that is, the starter motor, alternator, and power modulating device) are combined into one device. The smaller size and weight reduces inertia and allows the PMD 600 and M/G 601 to fit into a smaller space than would otherwise be required. Other embodiments, combining the PMD 600 and the M/G 601, provide increased efficiency from reducing the required number of bearings and eliminating another device and pulley.

Still referring to FIGS. 15B and 20, in one embodiment, the field 694 couples to a side cap 612 and to an end cap 658. The side cap 612 and the end cap 658 can be rigidly secured to the field 694 using standard fasteners. The side cap 612 can be a generally disc-shaped component and serves to contain lubricant, cooling fluid, and protect and contain the components of the PMD 600. In some embodiments, the side cap 612 and the end cap 658 are made of steel, although other materials can used. A traction ring bearing 605, which depending on the embodiment can support radial loads and/or axial loads, fits around the outside diameter of an extension of the traction ring 750 and an inside a bore of the end cap 658. The traction ring bearing 605 allows for relative movement between the traction ring 750 and the end cap 658. A cap bearing 626, positioned around the sun shaft 602 and inside a bore of the side cap 612, provides for relative movement between the field 694 and the sun shaft 602, and can support radial loads and in some embodiments axial loads. A thrust bearing 624, which serves to prevent axial movement of the side cap 612, fits between the side cap 612 and a shift screw 622. In some embodiments, the thrust bearing 624 can support radial loads as well as thrust loads, or only radial loads. The shift screw 622 is generally a stationary piece which can be mounted by standard fasteners to a rigid, non-moving structure, such as a frame or chassis that is capable of withstanding the highest torque transferred through the PMD 600. A shift nut 621 threads on the shift screw 622, and rotation of the shift nut 621 causes the sun shaft 602 to move axially, thereby shifting the PMD 600. The shift nut 621 is a generally annularly shaped component having a threaded central bore and does not experience high torque. In some embodiments, the shift nut 621 is made of aluminum, although other materials, including plastic and steel can be used.

Figure 27A:
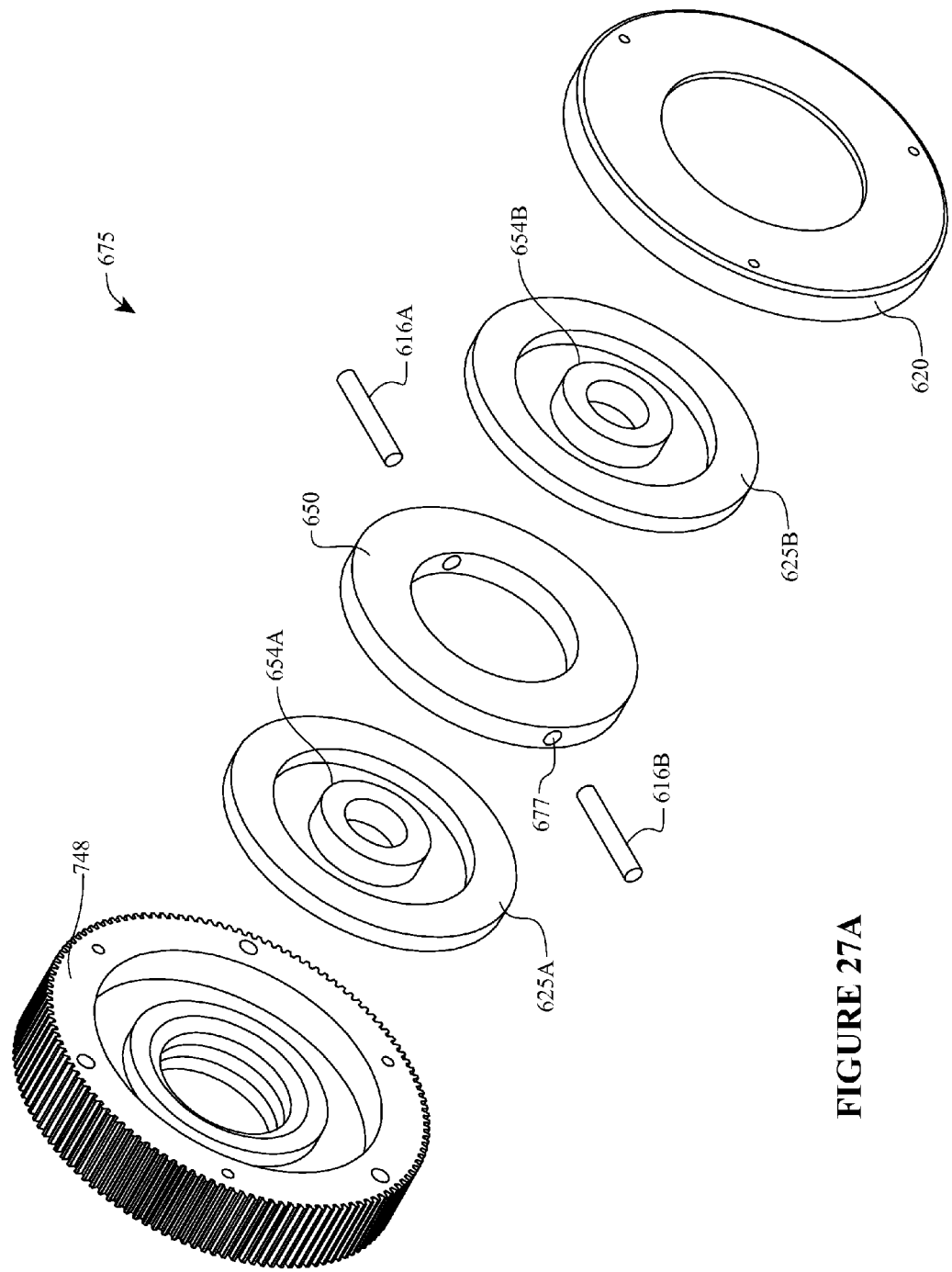
FIG. 27A is a perspective, exploded view of certain components of a control system for the compound device of FIG. 15B.
Figure 27B:
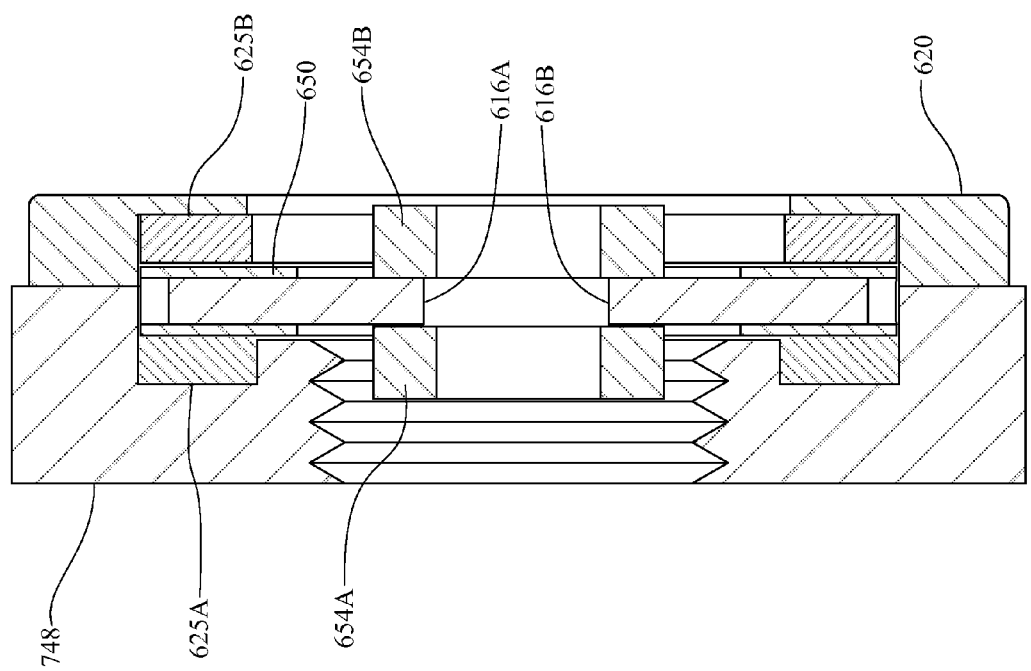
FIG. 27B is a cross-sectional view of the components shown in FIG. 27A.

Additionally referencing FIGS. 27A and 27B now, in one embodiment the PMD 600 is shifted using the previously described stepper motor 20 and driving gear 22. A shift gear 748 couples to the outside diameter of the shift ring 620 and the shift nut 621 using a key, standard fasteners, an interference fit, adhesive, or any other suitable method. The width of the shift gear 748 is sufficient to allow for axial movement of the shift ring 620 and the shift nut 621 and still engage the driving gear 22. Other shifting methods can be substituted in place of the motor 20, including centrifugal shifters that utilize one or more weights that reduce the speed of the output pulley 724 and the sun shaft pulley 722 as the speed of the prime mover increases, and increase the speed of the output pulley 724 and the sun shaft pulley 722 as the speed of the prime mover decreases.

The shift nut 621 attaches with standard fasteners to a disc-shaped shift ring 620 that has a central bore. In one embodiment, the shift ring 620 is made of the same material as the shift nut 621, although other materials may be used. The shift nut 621 and shift ring 620 contain two shift bearings 625A, 625B that minimize friction when the shift nut 621 and the shift ring 620 rotate relative to a pin mount 650. The pin mount 650 is disc-shaped, with a central bore that provides clearance over the shift screw 622. The pin mount 650 axis is concentric with the longitudinal axis 11 and is aligned by counterbores in the shift nut 621 and shift ring 620. The pin mount 650 has two threaded holes one-hundred-eighty degrees apart extending radially from its center; fewer or more threaded holes can be used. Two shift pins 616A, 616B, which in one embodiment thread into the threaded holes of the pin mount 650, but can also be pressed, welded, or inserted using any other suitable method, are threaded pins that extend into the bore of the pin mount 650, through slots in the shift screw 622, and into the bore of the shift screw 622. The shift pins 616A, 616B contact two pin bearings 654A, 654B which are positioned over the sun shaft 602 and inside the bore of the shift screw 622. The pin bearings 654A, 654B provide relative movement between the rotating sun shaft 602, and the shift pins 616A, 616B and also absorb thrust loads which occur from shifting the PMD 600.

Still referring to FIGS. 15B and 20, a stator bearing 614 fits in the bore of the stator plate 780B and around the sun shaft 602 to allow for axial movement between the sun shaft 602 and the stator plate 780B, and also to withstand radial loads. On one side of the sun shaft 602 near the end cap 658, a shaft bearing 610 mounts over the sun shaft 602 and inside the bore of a stator brace 608. In some embodiments, the shaft bearing 610 is a needle roller or cylindrical roller bearing where the rollers contact a hardened and polished area of the sun shaft 602. This allows the sun shaft 602 to move axially relative to the shaft bearing 610 with minimal friction. The stator brace 608 is generally cylindrical and in some embodiments is made from hardened steel, although any suitable material can be used. At a first end, the stator brace 608 rigidly attaches to a stator plate 780A with standard fasteners, weld, or pressed fit into a bore of the stator plate 780A. At a second end, the stator brace 608 rigidly attaches to a stationary structure, such as a frame or chassis. To provide relative movement between the stator brace 608 and the traction ring 750, one or more brace bearings 604A, 604B mount on the stator brace 608 and inside a bore of the traction ring 750. The brace bearings 604A, 604B also support radial loads and in some embodiments axial loads.

Figure 17:
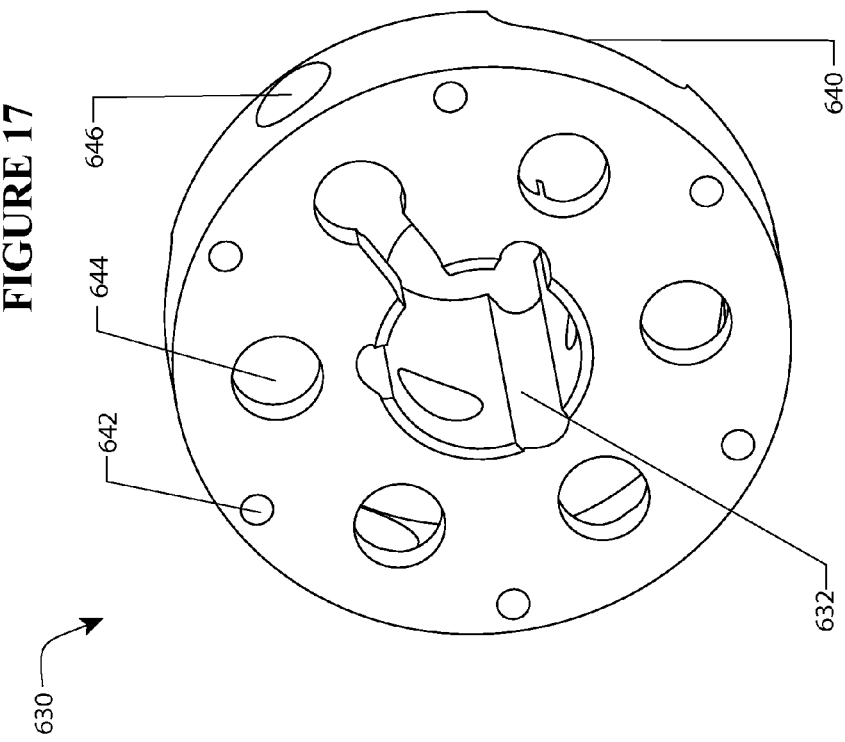
FIG. 17 is a perspective view of an armature mount of the compound device of FIG. 15B.
Figure 16:
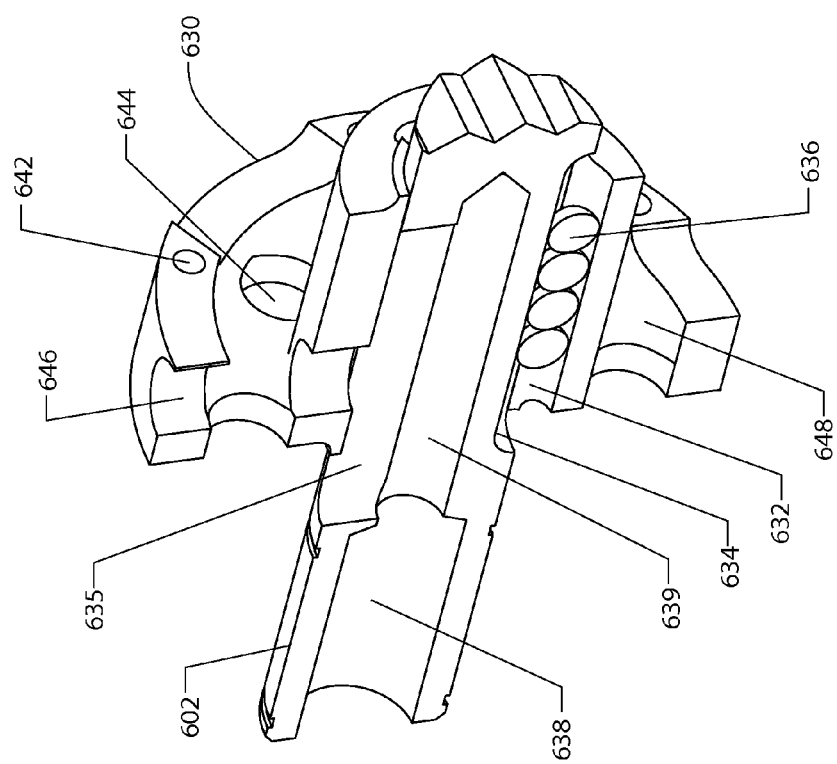
FIG. 16 is a partial perspective view of a spline assembly of the compound device of FIG. 15B.

Referring now to FIGS. 15B, 16, and 17, one method of power transfer between the sun shaft 602 and the armature 682 will be described now. In some embodiments, the sun shaft 602 includes one or more shaft grooves 634, which are generally longitudinal grooves parallel with the axis 11 and that in some embodiments have a radius slightly larger than the spline bearings 636. In some embodiments, the spline bearings 636 are generally spherical rolling elements that transfer torque between the armature 682 and the sun shaft

602. The spline bearings 636 can be made from hardened steel or other suitable materials. The number and size of spline bearings 636 used depends on the amount of torque which must be transferred, the radius and length of the shaft grooves 634, and the size of the PMD 600.

In one embodiment, formed into the inside diameter of the armature mount 630 are one or more mount grooves 632, which in some embodiments are identical to the shaft grooves 634, but in other embodiments can be longer or shorter, and also use a different radius. In some embodiments, the spline bearings 636 are positioned so that the center of each spline bearing 636 is halfway between the radial depth of both the shaft grooves 634 and the mount grooves 632. The spline bearings 636 are self centering because the spline bearings 636 roll tangentially up both the radii of the shaft grooves 634 and the mount grooves 632 an equal amount. Typically, when two or more shaft grooves 634 and mount grooves 632 are positioned angularly equidistant, the spline bearings 636 will center the armature 682 relative to the sun shaft 602. In some embodiments, a small amount of clearance is provided for the spline bearings 636 to allow the self-centering to occur and to aid in assembly. If a small amount of clearance is provided, the spline bearings 636 will also locate themselves in the proper position the first time the PMD 600 is shifted. When the PMD 600 is shifted, the spline bearings 636 roll axially along the shaft grooves 634 and the mount grooves 632 half the distance that the sun shaft 602 moves axially. Consequently, in certain embodiments, the length of the shaft grooves 634 and the mount grooves 632 are preferably about at least twice the length of the diameter of a spline bearing 636 times the number of spline bearings 636 in each shaft groove 634. In some embodiments, the stator bearing 614 and the cap bearing 626 are used to limit the axial movement of the spline bearings 636.

Referring now to FIGS. 15B, 16, 17, and 26, the routing of the electrical wires to the armature 682 will be described now. In some embodiments, three electrical wires are routed into a shaft hole 638 of the sun shaft 602 where, as previously described, the rotating conductor 672 converts the non-rotating wires to rotating wires. The wires housed in the cable 676 are routed into a cable tube 639, which is a hollow blind hole in the center of the sun shaft 602, and then through a shaft slot 635, which is a slot that extends axially along a portion of the sun shaft 602 forming a passage from the outside diameter of the sun shaft 602 to the cable tube 639. The three electrical wires (not shown) then exit the cable 676 and branch out to each of the three stator phases inside the wire cavity 648 of the armature mount 630. As the sun shaft 602 moves axially in the PMD 600 during shifting, the sun shaft 602 alternately lengthens and shortens the wires connected to the armature 682. The wire cavity 648 provides space for the required additional length of the electrical wires during shifting. In order to aid the routing of the electrical wires, the armature mount 630 includes one or more assembly holes 646 that provide access to the wires inside the wire cavity 648. Additionally, the armature mount 630 can include one or more routing holes 644 formed axially through a wall of the armature 630 to aid in routing each of the three electrical wires to their respective stator phases. The assembly holes 646 or the routing holes 644 can be used to access the electrical wires and the leads from the armature 682 so that the wires and leads can be pulled through the assembly holes 646 or routing holes 644, soldered together, insulated, and then reinserted into the wire cavity 648. In some embodiments, a radially extending wall of the armature mount 630 includes one or more lamination threaded holes 642 adapted to secure the armature 682 to the armature mount 630.

Figure 19:
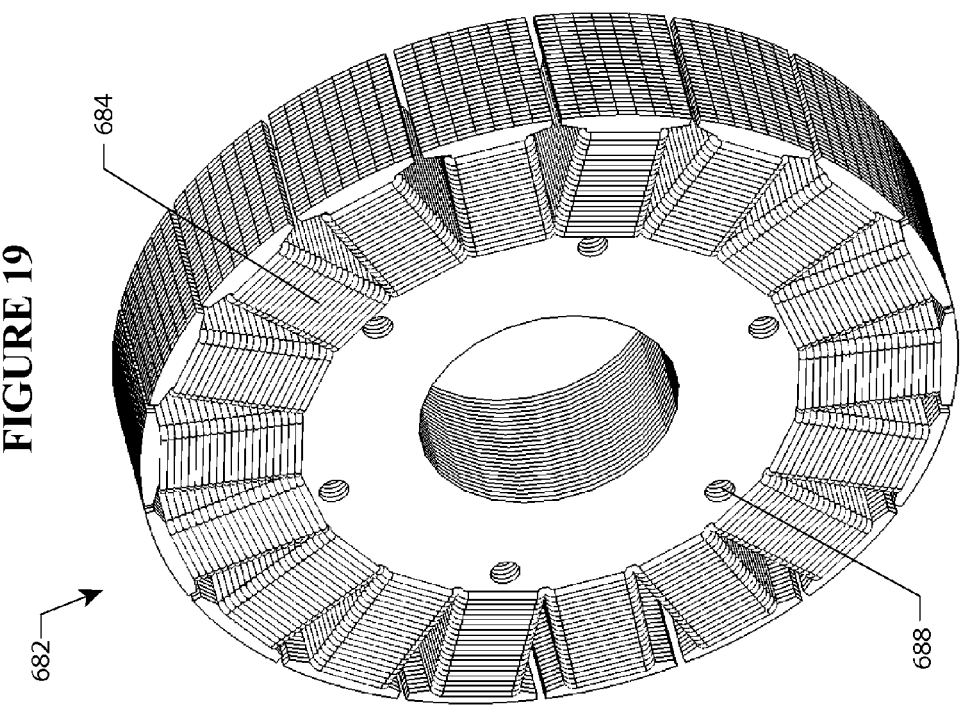
FIG. 19 is a perspective view of an armature of the compound device of FIG. 15B.
Figure 18:
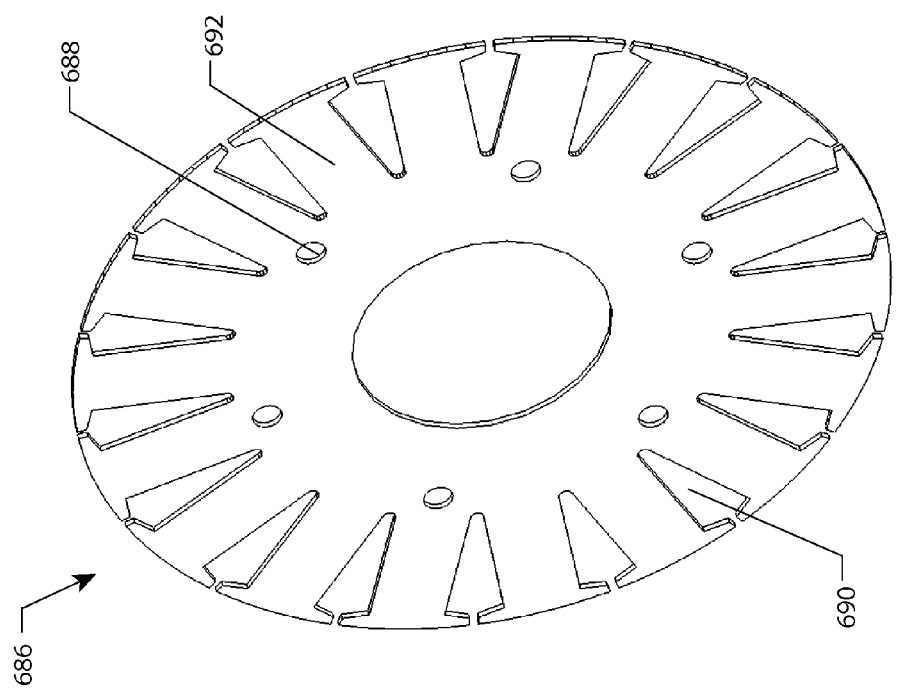
FIG. 18 is a perspective view of a lamination of the compound device of FIG. 15B.

Referring now to FIGS. 15B, 18, and 19, one embodiment of the armature 682 and the field 694 is illustrated. As best seen in FIG. 19, in some embodiments, the armature 682 includes an iron core, which consists of multiple laminations 686 stacked together, and several conducting wire coils 684 wrapped around each tooth 692 in the space provided by the slots 690. In other embodiments, ironless core stators are used. In some embodiments, eighteen slots 690 and eighteen teeth 692 are used; however, fewer or more can be used depending upon the application. In some embodiments, the lamination holes 688 in each lamination 686 are used to secure the armature 682 to the armature mount 630. In one embodiment standard fasteners, such as machine screws, are inserted through the lamination holes 688 and screwed into the threaded holes 642 of the armature mount 630.

Referring now to FIGS. 15B and 20, in some embodiments, four magnets 680 are used to create a four pole M/G 601; however, in other embodiments fewer or more magnets 680 can be used. The magnets 680 can be of the permanent magnet type and can be made from any suitable material, including hard ferrite ceramic, samarium cobalt, and neodymium boron iron. The magnets 680, in some embodiments, have a radius matching the inside diameter of the field 694 at their outside diameter and a radius on their inside diameter which is concentric with the field 694 and the armature 682. In some embodiments, the distance between the magnets 680 and the armature 682 is preferably as small as possible to maximize the magnetic flux and, thus, maximize the torque produced by the M/G 601, or the electricity produced by the alternator 601. Half of the magnets 680 are magnetized so that the polarity extends radially from south to north and the other half of the magnets 680 have a polarity extending radially from north to south. The magnets 680 are arranged so that every other magnet 680 has the same polarity.

Referring now to FIG. 15B, the sun 718, although similar to the sun 126 of the PMD 100, differs in that the sun 718 transfers power. The sun 718 rigidly attaches to the sun shaft 602 with an interference fit, weld, standard fasteners, a key, or any other suitable method. The sun bearings 717A, 717B provide for relative movement between the sun 718 and the non-rotating shift cams 713. The shift cams 713 are similar to the shift cams 127 of the PMD 100 except that the shift cams 713 are formed with clearance between their inside diameters and the sun shaft 602 to prevent interference between the shift cams 713 and the rotating and axially translatable sun shaft 602.

Referring now to FIGS. 15B, 20, 27A, and 27B, the shift screw 622 and related parts will be described now. In some embodiments, a support bracket 740 rigidly attaches to the shift screw 622 to maintain the stationary position of the shift screw 622 during operation. The support bracket 740 attaches to a rigid, not-rotating frame, chassis, or object. A shift bore 660, defined by the inside diameter of the shift screw 622, covers and protects the conductor cap 668, the rotating conductor 672, and other components. A shift slot 662 (see FIG. 20) extends axially to confine and prevent the leads 670 from rotating, and to allow the leads 670 to move axially as the PMD 600 is shifted. The threads 666 of the shift screw 622 can be of a pitch and size to accommodate various shifting speeds, as well as the shift force that must be overcome. In some embodiments, the number of threads 666 is preferably of an axial length which is greater than the axial movement of the sun shaft 602 to improve ease of assembly and looser tolerances.

The pin mount 650 has a bore slightly larger than the diameter of the threads 666 to provide clearance and unrestricted movement. To shift the PMD 600, the shift nut 621 rotates which causes the pin mount 650 to move axially. Two shift pins 616A, 616B screw into the threaded pin holes 656A, 656B and extend beyond the bore of the pin mount 650 into the shift bore 660. The shift pins 616A, 616B contact two pin bearings 654A, 654B which are positioned on each side of the shift pins 616A, 616B and provide for relative movement between the sun shaft 602 and the shift pins 616A, 616B, as well as to absorb axial forces. The pin bearings 654A, 654B can be held in position by standard fasteners, and in one embodiment, retaining rings are used and inserted into grooves formed into the surface of the sun shaft 602 on a side of the pin bearings 654A, 654B facing away from the shift pins 616A, 616B.

Referring to FIGS. 15B and 20, the input pulley 720 is adapted to receive mechanical power input from a belt (not shown) that operably attaches to, for example, a pulley on an engine crankshaft. In still other embodiments, the input pulley 720 can be a sprocket driven by a chain. Power flows from the input pulley 720, through the traction ring 750, the planets 101, the second traction ring 134, and out from the output pulley 724. The input pulley 720 and/or the output pulley 724 can be in some embodiments a v-belt pulley, serpentine belt pulley, timing belt pulley, or any other type of pulley or a sprocket. The output pulley 724 rotates in the same direction as the input pulley 720 and can be configured to power accessories and other devices in, for example, an automobile.

In certain embodiments, power can also be routed from the planets 101 through the sun 718, the sun shaft 602, and out the sun shaft pulley 722. The sun shaft pulley 722 rotates at a higher speed and in the opposite direction of the output pulley 724, and can power accessories and other devices in the automobile. The sun shaft pulley 722 in some embodiments has pulley mount grooves 732, which can be the same shape and perform the same function as the mount grooves 632. The sun shaft 602 in some embodiments has pulley shaft grooves 734, which can be the same shape and perform the same function as the shaft grooves 634. Pulley spline bearings 736, which in some embodiments are identical to the spline bearings 636, are inserted into the slots created by the pulley mount grooves 732 and the pulley shaft grooves 734.

Still referring to FIGS. 15B and 20, a flange 738 rigidly attaches to the stator brace 608 via a key, spline, interference fit, standard fasteners, or any other suitable method. In some embodiments, a flange nut 730 threads over a first end of the stator brace 608 to constrain axially the flange 738. In one embodiment, the flange 738 has a cutaway to provide an opening for a belt (not shown) that wraps around the sun shaft pulley 722. The pulley bearings 728A, 728B, positioned on each side of the sun shaft pulley 722, constrain axially the sun shaft pulley 722 during shifting of the PMD 600. A cover plate 726 attaches to the flange 738. In some embodiments, standard fasteners secure the flange 738 to the cover plate 726, both of which may be fastened to a frame, support bracket, or other stationary component, for mounting of the PMD 600.

Any one of the input pulley 720, sun shaft pulley 722, or output pulley 724, can be driven by a belt attached to a pulley of the engine crankshaft. Additionally, any of the pulleys 720, 722, or 724 can be configured to power accessories or devices of the automobile. In some embodiments only one of the pulleys 720, 722, 724 is used to power accessories so that there is one pulley operably attached to the engine crankshaft and only one pulley powering accessories. In these embodiments, the remaining pulley can be removed or is not used.

Referring to FIGS. 15B, 20, 23-25, an alternative embodiment of a traction ring 750 is described. In applications where the M/G 601 functions primarily as a motor, toque enters the PMD 600 at the second traction ring 134, and power moves through the planets 101 to the traction ring 750. In such backdriving conditions, the cam loader 154 preferably uses shallow v-shaped ramps on the traction ring 750 and/or the first load cam ring 157. The shallow v-ramps allow optimal axial force to be produced regardless of whether torque enters through the traction ring 750 or the second traction ring 134. FIGS. 23-25 depict an embodiment where shallow v-shaped ramps are formed into a surface of the traction ring 750 on the side opposite the contact surface 111. In certain embodiments, the ramp surfaces 752 are a mirror image on either side of the v-center 754. The v-center 754 is the lowest point on the ramps and the ramp surfaces 752 slope up on either side of the v-center 754.

Turning now to FIGS. 26A-26C and referencing FIG. 15B, one embodiment of a sun shaft 602 includes one or more pulley shaft grooves 734 adapted to cooperate with the pulley spline bearings 736 and the pulley mount grooves 732 to transfer torque from the sun shaft 602 to the sun shaft pulley 722 or vice versa. The sun shaft 602 can also include one or more shaft grooves 634 adapted to cooperate with the spline bearings 636 and the mount grooves 632 to transfer torque from the sun shaft 602 to the armature mount 630 or vice versa. In one embodiment, the sun shaft 602 can include a seat 669 adapted to support the sun 718 and to couple the sun shaft 602 to the sun 718. The seat 669 can include a spline or key coupling (not shown), for example, to engage a corresponding coupling on the sun 718. To facilitate the housing and routing of the cable 676 and the housing of the receptacle 674, the sun shaft 602 can include a shaft hole 638 and a cable tube 639 that are formed generally within and concentrically with the sun shaft 602. As shown in FIGS. 26A-26C, the sun shaft 602 in some embodiments includes an elongated neck portion 668 adapted to provide sufficient clearance with other components of the PMD 600 and yet capable to withstand and transfer the torques that arise during operation of the PMD 600. The sun shaft 602 can be constructed of any suitable material designed to withstand the torque and speed of the PMD 600; in some embodiments the sun shaft 602 is made of hardened steel, although mild steel, aluminum, titanium, carbon fiber, can also be employed.

Referencing FIGS. 27A-27B now, a control mechanism subassembly 675 for the PMD 600 can include a shift gear 748 adapted to receive a shift bearing 625A and a pin bearing 654A. The control mechanism subassembly 675 can have additionally a shift ring 620 adapted to receive a shift bearing 625B and a pin bearing 654B. The shift gear 748 and the shift ring 620 can be fastened together to form an enclosure that includes a pin mount 650 positioned between the shift bearings 625A, 625B. The pin mount 650 is adapted to receive shift pins 616A, 616B that are configured, for example, to thread into radial threaded holes 677 of the pin mount 650. As already discussed above, a rotation of the shift gear 748 on the shift screw 622 causes the pins 616A, 616B to actuate an axial movement of the sun shaft 602 via axial actuation of the pin bearings 654A, 654B that are operationally coupled to the sun shaft 602.

Figure 28:
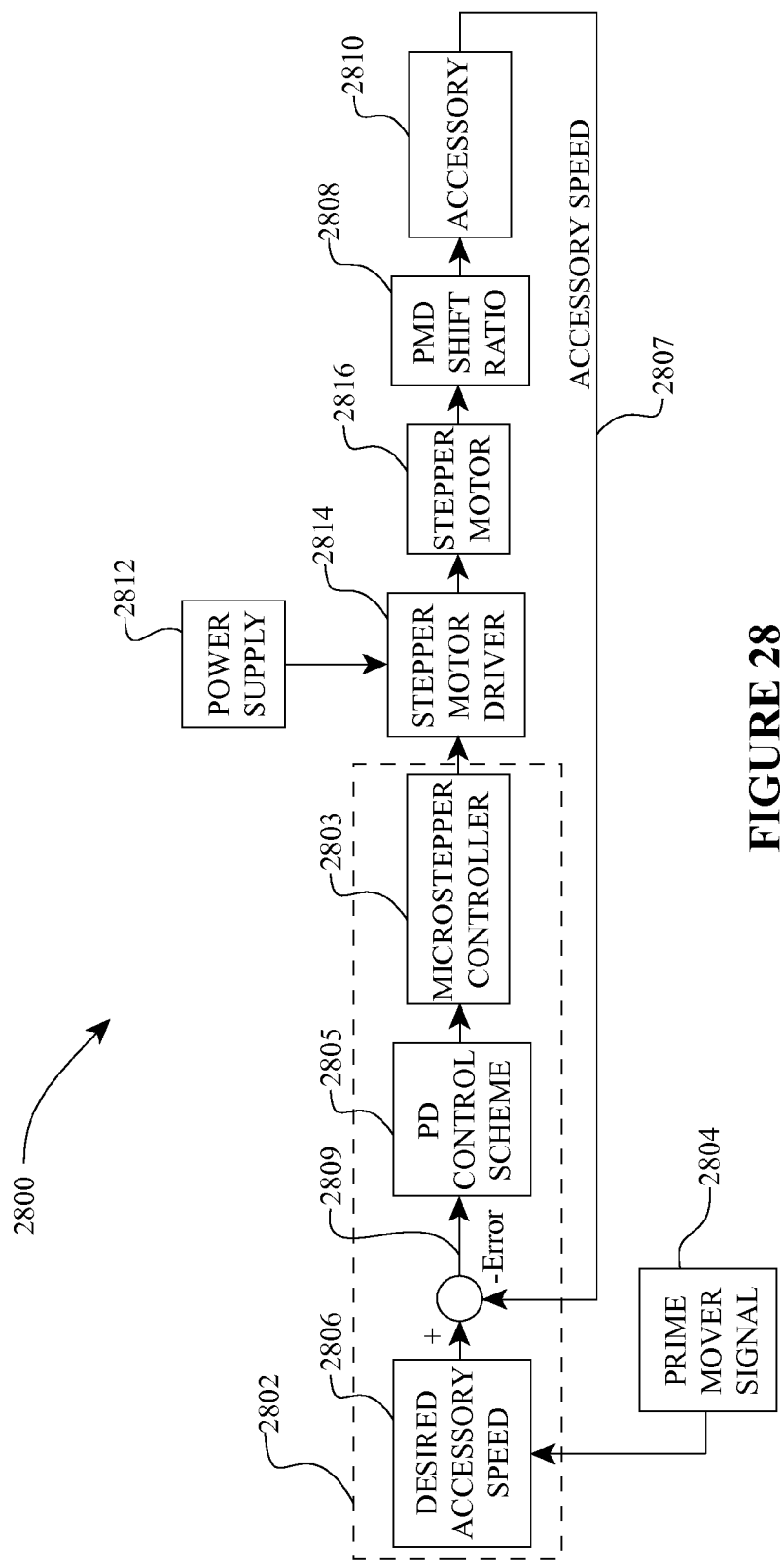
FIG. 28 is a block diagram of a control system that can be used with the power modulating devices described herein.

Referencing FIG. 28 now, it shows a control system 2800 that can be used with the drivetrains described here. Control hardware and software 2802 can include, for example, a microstepper controller microprocessor 2803 for receiving a signal from a proportional-differential control scheme 2805, which can reside in a memory of the control hardware and software 2802. A desired accessory speed 2806 can be stored in the memory for use by the control hardware and software 2802. The microprocessor 2803, in one embodiment, receives signals indicative of the speed of a prime mover 2804 (for example, a signal from a speed sensor of the crankshaft of an internal combustion engine) and the actual accessory speed 2807 (for example, a signal from a speed sensor of an accessory 2810).

The proportional-differential control 2805 is adapted to implement a control strategy. The control hardware and software 2802 calculates an error 2809 between a desired accessory speed 2806 and an actual accessory speed 2807 (obtained by a feedback loop). The hardware and software 2802 scales the error 2809 with a proportional constant and a differential constant. If there is a difference between the desired accessory speed 2806 and actual accessory speed 2807, the stepper motor driver 2814 causes the stepper motor 2816 to adjust the ratio 2808 of a PMD to cause the speed of the accessory 2810 to more closely match the desired accessory speed 2806. When the actual accessory speed 2807 becomes substantially equal to the desired accessory speed 2806 no error signal will be present and the stepper motor 2816 can be deactivated. In other embodiments, the stepper motor 2816 is maintained energized to hold the ratio 2808. In yet other embodiments, a locking mechanism (not shown) can be used to prevent the ratio 2808 of the PMD from changing while the stepper motor 2816 is deactivated. In one embodiment, the stepper motor 2816 can be driven by a power supply such as a 12V or a 42 V battery or system.

The embodiments described herein are examples provided to, among other things, meet legal requirements. These examples are only embodiments that may be used and are not intended to be limiting in any manner. Therefore, the claims that follow, rather than the examples, define the invention.

What we claim is:

1. A method for modulating power to an accessory in a vehicle using a controller with logic, the method comprising:
   receiving, from a sensor, a signal associated with a power output by a prime mover;
   comparing the signal with a desired input speed for an accessory; and
   adjusting the speed provided by the prime mover to a speed required by the accessory using a power modulating device, wherein the power modulating device includes
      a housing,
      a variator in the housing, the variator comprising
         a plurality of spherical planets, each spherical planet having a planet axle,
         a sun in contact with each of the plurality of spherical planets,
         first and second traction rings in contact with the plurality spherical planets, wherein a motor is configured to cause a change in a tilt angle of the planet axles for the plurality of spherical planets, wherein changing a tilt angle of the plurality of spherical planets causes a change in a speed ratio of the power modulating device in response to a change in the power output by the prime mover, and
      a control mechanism for controlling a speed of the variator.

2. The method of claim 1, wherein the desired input speed of the accessory comprises an operating range of the accessory.

3. The method of claim 2, wherein a desired operating power of the accessory is based on maximized efficiency.

4. The method of claim 1, wherein the accessory comprises one of a compressor, a valve, a fan, an alternator, a power takeoff device (PTO), a pump, a generator, or an auxiliary electric motor.

5. The method of claim 1, wherein the tilt angle of the plurality of spherical planets is adjusted using a skew-based system.

6. The method of claim 1, wherein a first coupling couples the power modulating device to a crankshaft of an engine.

7. The method of claim 1, wherein the power modulating device further comprises:
   an electrical armature operably coupled to the sun; and
   an electrical field mounted coaxially about and concentrically with the electrical armature, wherein the electrical armature and the electrical field are located in the housing.

8. The method of claim 7, wherein the power modulating device is configured to function as an electric generator.

9. The method of claim 7, wherein the power modulating device is configured to function as an electric motor.

10. A method for providing constant power to an accessory in a vehicle by a controller with logic, the method comprising:
    receiving, from a sensor, a signal associated with power generated by a prime mover;
    comparing the signal with a desired input speed for an accessory;
    communicating with a motor configured to adjust a speed ratio of a power modulating device coupled by a first coupling to the prime mover and coupled by a second coupling to the accessory, the power modulating device comprising
       a plurality of spherical planets, each spherical planet having a planet axle;
       a sun in contact with each of the plurality of spherical planets; and
       first and second traction rings in contact with the plurality spherical planets, wherein the motor is configured to cause a change in a tilt angle of the planet axles for the plurality of spherical planets, wherein changing a tilt angle of the plurality of spherical planets causes a change in a speed ratio of the power modulating device to maintain a desired power input to the accessory, and wherein the motor, the plurality of spherical planets, the sun, and the first and second traction rings are contained within a housing.

11. The method of claim 10, wherein the speed ratio is based on maximized efficiency of the accessory.

12. The method of claim 10, wherein the accessory comprises one of a compressor, a valve, a fan, an alternator, a power takeoff device (PTO), a pump, a generator, and an auxiliary electric motor.

13. The method of claim 10, wherein the tilt angle of the plurality of spherical planets is adjusted using a skew-based system.

14. The method of claim 10, wherein the first coupling couples the power modulating device to a crankshaft of an engine.

15. The method of claim 10, wherein the power modulating device further comprises:
- an electrical armature operably coupled to the sun; and
- an electrical field mounted coaxially about and concentrically with the electrical armature.

16. The method of claim 15, wherein the power modulating device is configured to function as an electric generator.

17. The method of claim 15, wherein the power modulating device is configured to function as an electric motor.

* * * * *